US010462436B2

(12) United States Patent
Kadotani et al.

(10) Patent No.: US 10,462,436 B2
(45) Date of Patent: Oct. 29, 2019

(54) PROJECTOR

(71) Applicant: Seiko Epson Corporation, Tokyo (JP)

(72) Inventors: Norikazu Kadotani, Matsumoto (JP);
Takahiro Totsuka, Azumino (JP);
Kensaku Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 15/284,230

(22) Filed: Oct. 3, 2016

(65) Prior Publication Data

US 2017/0104965 A1   Apr. 13, 2017

(30) Foreign Application Priority Data

Oct. 7, 2015   (JP) .................................. 2015-199157
Oct. 7, 2015   (JP) .................................. 2015-199158

(51) Int. Cl.
| *H04N 9/31* | (2006.01) |
| *G03B 21/00* | (2006.01) |
| *G03B 21/14* | (2006.01) |
| *G03B 21/16* | (2006.01) |

(52) U.S. Cl.
CPC ......... *H04N 9/3144* (2013.01); *G03B 21/005* (2013.01); *G03B 21/142* (2013.01); *G03B 21/16* (2013.01); *G03B 2205/0069* (2013.01)

(58) Field of Classification Search
CPC .. H04N 9/3144; G03B 21/005; G03B 21/142; G03B 21/16
USPC ......................................................... 353/30
See application file for complete search history.

(56) References Cited

U.S. PATENT DOCUMENTS

| 2005/0275810 A1 | 12/2005 | Choi et al. |
| 2006/0140511 A1* | 6/2006 | Chang .................. H04N 5/7458 |
| | | 382/298 |
| 2011/0211166 A1* | 9/2011 | Kawano ................. G03B 21/16 |
| | | 353/20 |
| 2011/0242500 A1 | 10/2011 | Sakai et al. |

FOREIGN PATENT DOCUMENTS

| CN | 1918907 A | 2/2007 |
| CN | 102207666 A | 10/2011 |
| JP | 2001-312003 A | 11/2001 |
| JP | 2007-206567 A | 8/2007 |
| JP | 2008-170774 A | 7/2008 |
| JP | 2012-247486 A | 12/2012 |
| JP | 2013-178416 A | 9/2013 |
| KR | 20070100579 A | 10/2007 |

* cited by examiner

*Primary Examiner* — Steven Whitesell Gordon
*Assistant Examiner* — Jerry L Brooks
(74) *Attorney, Agent, or Firm* — ALG Intellectual Property, LLC

(57) ABSTRACT

A projector includes: a light source; a light modulation device that modulates light emitted from the light source; an optical projection device that projects the light modulated by the light modulation device; a light path changing element (shift element) that is disposed between the light modulation device and the optical projection device and changes a light path of the light modulated by the light modulation device through fluctuation; and a cooling device that cools the light modulation device and the light path changing element (shift element).

6 Claims, 21 Drawing Sheets

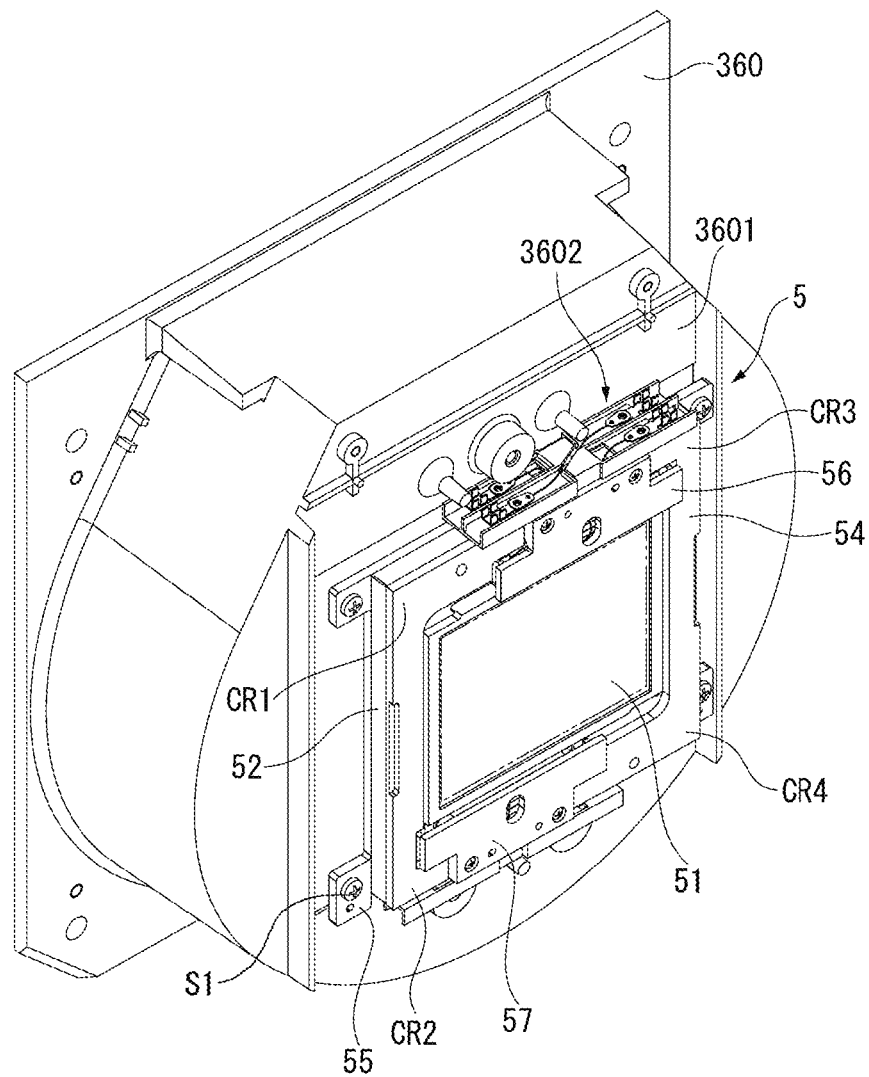
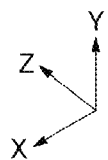
FIG. 5

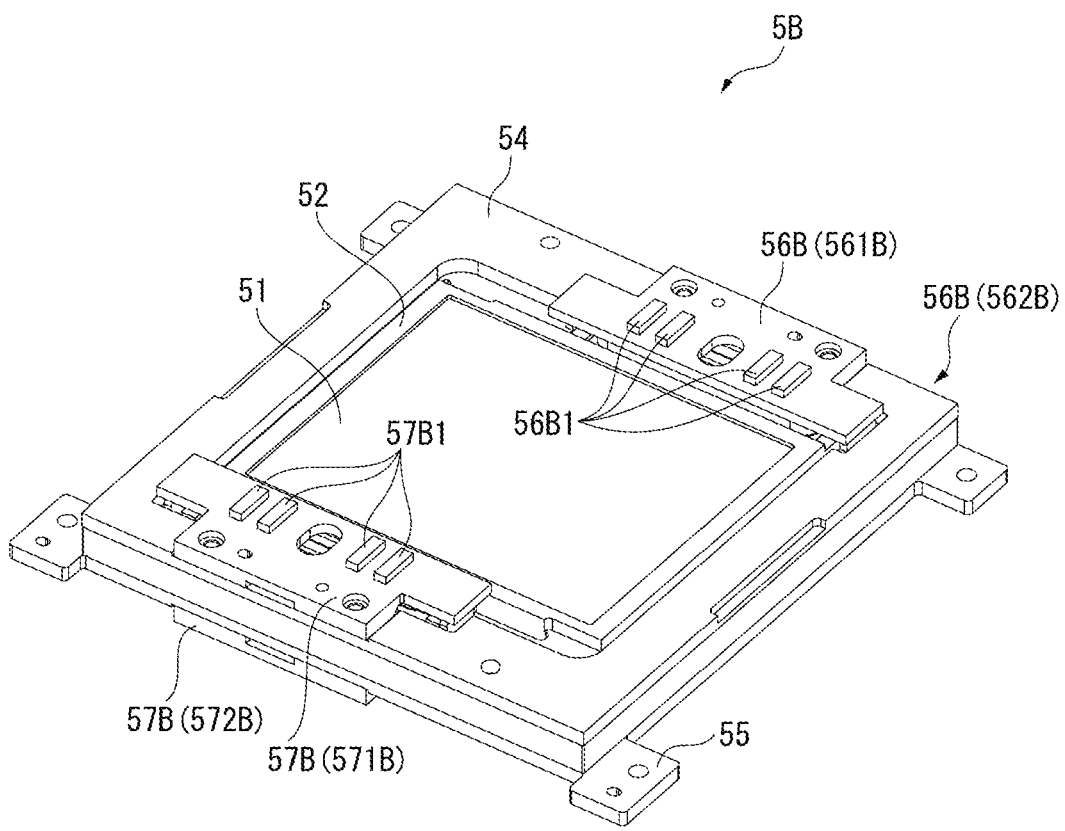
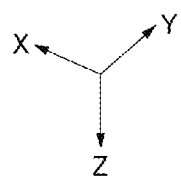
FIG.14

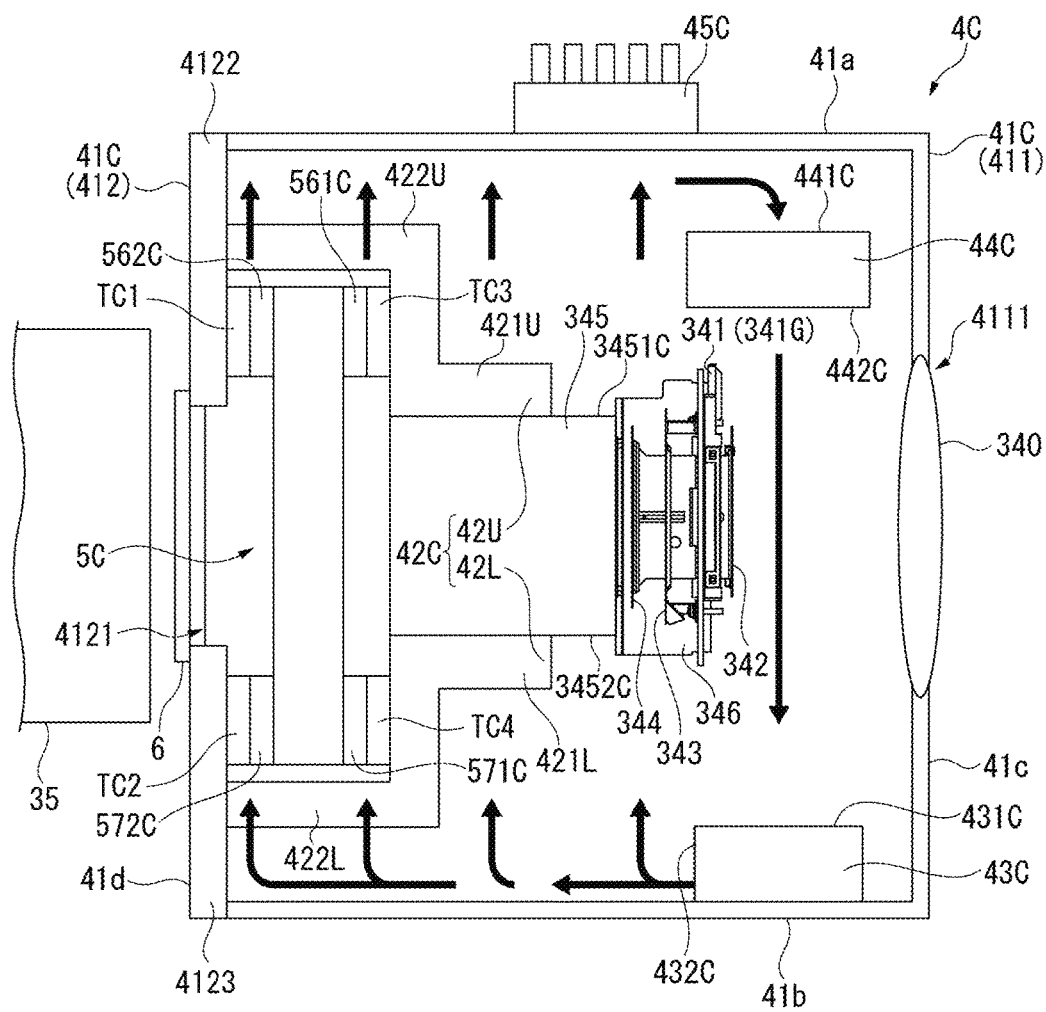
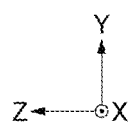
FIG.21

PROJECTOR

CROSS REFERENCE TO RELATED APPLICATIONS

The entire disclosures of Japanese Patent Application No. 2015-199157 filed Oct. 7, 2015, and Japanese Patent Application No. 2015-199158 filed Oct. 7, 2015, are expressly incorporated by reference herein.

BACKGROUND

1. Technical Field

The present invention relates to a projector.

2. Related Art

In the related art, there are known projectors each including an illumination device, a light modulation device that modulates light emitted from the illumination device and forms an image according to image information, and an optical projection device that expands and projects the image to a projection surface such as a screen (for example, see JP-A-2001-312003).

The projector disclosed in JP-A-2001-312003 includes a color separation optical device that separates a light flux emitted from a light source into pieces of respective color light of red, green, and blue, three liquid crystal panels that are installed for each of the pieces of separated color light, a prism that combines the color light modulated by the three liquid crystal panels, an optical projection device that projects the combined light, and a cooling device that sends air introduced from the outside of a casing to the liquid crystal panels to cool the liquid crystal panels. In the cooling device of the devices, cooling fans are installed according to the number of liquid crystal panels. The cooling fans independently send cooling airs to the corresponding liquid crystal panels.

Incidentally, high resolutions of projected images have recently been requested even in projectors. Accordingly, in order to cause the resolution of an image to be projected to be higher than the resolution of a light modulation device such as a liquid crystal panel, a light path changing element that changes a light path of the light is considered to be installed between the prism and the optical projection device and shift an axis of video light emitted from the light modulation device.

However, since the light path changing element is disposed between the prism and the optical projection device, the cooling device of the projector disclosed in JP-A-2001-312003 may not cool the light path changing element. An increase in the size of the projector and high luminance result in an increase in the size of the light path changing element, and thus a problem may arise in that the function of the light path changing element deteriorates due to heat generated in driving of the light path changing element.

Therefore, there is a request for a projector capable of supplying a cooling gas to a plurality of cooling targets such as the light modulation device and the light path changing element.

When a projector including a light path changing element is used in an event site such as an outdoor place, there is a concern of fats or dusts based on smoke being attached to the light path changing element. In this case, there is a problem that driving of the light path changing element is affected.

Therefore, there is a request for a projector in which dusts or the like are rarely attached to the light path changing element.

SUMMARY

An advantage of some aspects of the invention is to provide a projector capable of supplying a cooling gas to a plurality of cooling targets or a projector capable of suppressing attachment of dusts to a light path changing element.

A projector according to an aspect of the invention includes: a light source; a light modulation device that modulates light emitted from the light source; an optical projection device that projects the light modulated by the light modulation device; a light path changing element that is disposed between the light modulation device and the optical projection device and changes a light path of the light modulated by the light modulation device through fluctuation; and a cooling device that cools the light modulation device and the light path changing element.

A shift element changing the light path of the incident light can be exemplified as the light path changing element.

According to the aspect of the invention, since the cooling gas can be supplied to the light modulation device and the light path changing element which are a plurality of cooling targets, it is possible to prevent the temperature of the light modulation device from being increased. Since the light path changing element is cooled by the cooling device, it is possible to prevent the temperature of the light path changing element from being increased due to the light incident from the light modulation device.

In the aspect of the invention, it is preferable that the projector further includes: a plurality of the light modulation devices; and a light combination device that combines and exits pieces of light modulated by the plurality of light modulation devices, the optical projection device projects the light exited from the light combination device, and the light path changing element is disposed between the light combination device and the optical projection device.

According to the aspect of the invention with this configuration, the light path changing element is disposed between the light combination device and the optical projection device. When the light path changing element is cooled, the light combination device can be cooled along with the light path changing element. Accordingly, it is possible to prevent the temperature of the light path changing element from being increased due to the light incident from the light combination device.

In the aspect of the invention, it is preferable that the cooling device includes a cooling fan that sends a cooling gas and a duct member that circulates the cooling gas from the cooling fan in the plurality of light modulation devices, and the duct member includes a sending port that circulates the cooling gas toward the light path changing element.

According to the aspect of the invention with this configuration, since the duct member circulating the cooling gas in the light modulation device includes the sending port, it is not necessary to separately install the cooling device that cools the light path changing element. Thus, it is possible to miniaturize the cooling device, and thus it is possible to miniaturize the projector.

In the aspect of the invention, it is preferable that the light path changing element includes a permanent magnet, an optical member that changes the light path of the light fluctuated and incident by the permanent magnet, a holding portion that holds the optical member and the permanent magnet, and a pair of coils that are disposed in the holding portion with the permanent magnet interposed therebetween.

Here, when power is supplied to one pair of coils disposed with the permanent magnet interposed therebetween, the permanent magnet is displaced, and thus a magnetic force displacing the light path changing element is generated and the temperature of the coils is increased. In this way, when the temperature of the coils is increased, the magnetic force of the coils generating the magnetic force is weakened in some cases.

In contrast, according to the aspect of the invention with the configuration described above, since the cooling gas is supplied to the light path changing element, it is possible to prevent the temperature of the light path changing element, that is, one pair of coils included in the light path changing element, from being increased. Accordingly, since it is possible to prevent the magnetic force of the coils installed in the light path changing element from being reduced, it is possible to stabilize driving of the light path changing element.

In the aspect of the invention, it is preferable that the light path changing element includes a coil holding portion holding the one pair of coils and mounted on the holding portion, and the sending port circulates at least a part of the cooling gas in the coil holding portion.

According to the aspect of the invention with this configuration, since the coils are held to be fixed to the holding portions of the light path changing element by the coil holding portions and at least a part of the cooling gas is circulated in the coil holding portions, it is possible to reliably cool the coil holding portions. Accordingly, by cooling the coil holding portions, it is possible to cool the coils held by the coil holding portions and it is possible to prevent the temperature of the coils from being increased.

In the aspect of the invention, it is preferable that the coil holding portion includes a heat radiation portion.

A fin or the like can be exemplified as the heat radiation portion.

According to the aspect of the invention with this configuration, since the coil holding portions include the heat radiation portion, a heat radiation amount of the coil holding portions is greater than a heat radiation amount of the coil holding portions not including the heat radiation portion. Thus, by supplying the cooling gas to the heat radiation portions of the coil holding portions, it is possible to cool the coil holding portions more reliably. Accordingly, it is possible to reliably cool the coils held in the coil holding portions and prevent from the temperature of the coils from being increased.

In the aspect of the invention, it is preferable that the coil holding portion includes an extension extending toward the sending port.

According to the aspect of the invention with this configuration, since the coil holding portion includes the extension, the heat radiation area of the coil holding portion including the extension is greater than the heat radiation area of the coil holding portion not including the extension. Thus, since the cooling gas is supplied to the coil holding portion (the extension), it is possible to cool the coil holding portion more reliably. Accordingly, it is possible to reliably cool the coil held in the coil holding portion and prevent the temperature of the coil from being increased.

In the aspect of the invention, it is preferable that the light combination device includes three incidence surfaces on which the light via the plurality of light modulation devices is incident, and one exit surface through which the light incident from the three incidence surfaces and combined is exited, the duct member includes a plurality of ducts that are installed to correspond to the plurality of light modulation devices and send the cooling gas circulated inside to the corresponding light modulation devices, and of the plurality of ducts, the ducts corresponding to the light modulation devices disposed to be opposite to each other with the light combination device interposed therebetween each include a branch portion that branches the cooling gas circulated inside and sends the cooling gas from the sending port.

The cross dichroic prism can be exemplified as the light combination device.

According to the aspect of the invention with this configuration, it is possible to supply the cooling gas to the light modulation device and the light path changing element via two ducts according to the light modulation devices disposed to be opposite to each other with the light combination device interposed therebetween. That is, since the cooling gas is supplied from two sending ports to the light path changing element, it is possible to reliably cool the light path changing element. Since the cooling gas can be supplied to the light modulation device and the light path changing element without further installing the duct circulating the cooling gas to the light path changing element, it is possible to miniaturize the cooling device, and thus it is possible to miniaturize the projector.

In the aspect of the invention, it is preferable that the light path changing element includes two fluctuation members including the permanent magnet and the one pair of coils, of the light modulation devices disposed to be opposite to each other with the light combination device interposed therebetween, one of the fluctuation members is disposed on a side of one light modulation device and the other fluctuation member is disposed on a side of the other light modulation device, and the one fluctuation member is disposed at a position opposite to the other fluctuation member with the optical member interposed therebetween when viewed in an incidence direction of light on the optical member.

According to the aspect of the invention with this configuration, the position of one fluctuation member is close to the position of one light modulation device. The position of the other fluctuation member is close to the position of the other light modulation device. Therefore, since the position of each of the light modulation devices disposed to face one another is close to the position of each of the fluctuation members, it is possible to simplify the configuration of the branch portion that circulates the cooling gas from the duct corresponding to the closely disposed light modulation device to the fluctuation member. Since the distance from the branch portion of the duct portion to the sending port can be shortened, it is possible to suppress a reduction of a circulation speed of the cooling gas circulated in the duct. Accordingly, it is possible to cool the light path changing element more reliably.

A projector according to another aspect of the invention includes: a light source; a light modulation device that modulates light emitted from the light source; an optical projection device that projects the light modulated by the light modulation device; a light path changing element that is disposed between the light modulation device and the optical projection device and changes a light path of the light modulated by the light modulation device through fluctuation; an exterior casing that forms an exterior, and an internal casing in which the light path changing element is disposed.

The shift element changing the light path of the incident light can be exemplified as the light path changing element.

According to the aspect of the invention, since the light path changing element is disposed in the internal casing, it is possible to prevent dust from being attached to the light path changing element. Accordingly, it is possible to further improve luminance of an image to be projected from the projector.

In the aspect of the invention, it is preferable that the light modulation device is disposed in the internal casing.

According to the aspect of the invention with his configuration, since the light modulation device and the light path changing element are disposed in the internal casing, it is possible to prevent dust from being attached to the light modulation device and the light path changing element. Accordingly, it is possible to further improve luminance of an image to be projected from the projector.

In the aspect of the invention, it is preferable that the projector further includes: a plurality of the light modulation devices; and a light combination device that combines and exits pieces of light modulated by the plurality of light modulation devices, the optical projection device projects the light exited from the light combination device, and the light combination device is disposed in the internal casing.

According to the aspect of the invention with this configuration, since the plurality of light modulation devices, the light path changing element, and the light combination device are disposed in the internal casing, it is possible to prevent dust from being attached to the light path changing element, the light path changing element, and the light combination device. Accordingly, it is possible to further improve luminance and saturation of an image to be projected from the projector.

In the aspect of the invention, it is preferable that the projector further includes a support member that is disposed in the internal casing and supports the light combination device, the light path changing element includes a permanent magnet, an optical member that changes the light path of the light fluctuated and incident by the permanent magnet, a holding portion that holds the optical member and the permanent magnet, a pair of coils that are disposed in the holding portion with the permanent magnet interposed therebetween, a coil holding portion that holds the one pair of coils, and a heat transmission portion that comes into contact with the coil holding portion, and the heat transmission portion comes into contact with the support member so that heat is transmittable to the support member.

Here, when power is supplied to one pair of coils disposed with the permanent magnet interposed therebetween, the permanent magnet is displaced, and thus a magnetic force displacing the light path changing element is generated and the temperature of the coils is increased. In this way, when the temperature of the coils is increased, the magnetic force of the coils generating the magnetic force is weakened in some cases.

In contrast, according to the aspect of the invention with the configuration described above, the heat transmission portion fixed to the coil holding portion of the light path changing element comes into contact with the support member. Therefore, when the heat of the coils is increased, the heat of the coils is transmitted to the support member via the heat transmission portion. Thus, it is possible to prevent the temperature of one pair of coils included in the light path changing element from being increased. Accordingly, since it is possible to prevent the magnetic force of the coils included in the light path changing element from being reduced, it is possible to stabilize driving of the light path changing element.

In the aspect of the invention, it is preferable that the internal casing is a sealed casing, the light combination device includes first and second support surfaces that are located to be opposite to each other and are connected to the support member, the support member includes a first support portion connected to the first support surface and a second support portion connected to the second support surface, and the heat transmission portion comes into contact with at least one of the first and second support portions so that heat is transmittable.

According to the aspect of the invention with this configuration, the heat transmission portion comes into contact with at least one of the first and second support portions supporting the first and second support surfaces of the light combination device. Therefore, when the heat of the coils is increased, the heat of the coils is transmitted to the support member via the heat transmission portion. Thus, it is possible to prevent the temperature of one pair of coils included in the light path changing element from being increased. Accordingly, since it is possible to prevent the magnetic force of the coils included in the light path changing element from being reduced, it is possible to stabilize the driving of the light path changing element.

In the aspect of the invention, it is preferable that the heat transmission portion comes into contact with the internal casing so that heat is transmittable.

According to the aspect of the invention with this configuration, the heat transmission portion comes into contact with the internal casing so that heat is transmittable. Therefore, when the heat of the coils is increased, the heat of the coils is transmitted to the internal casing via the heat transmission portion. Thus, it is possible to prevent the temperature of one pair of coils included in the light path changing element from being increased. Accordingly, since it is possible to prevent the magnetic force of the coils included in the light path changing element from being reduced, it is possible to stabilize the driving of the light path changing element.

In the aspect of the invention, it is preferable that the internal casing includes a heat transmission spot coming into contact with the heat transmission portion.

According to the aspect of the invention with this configuration, the heat transmission portion comes into contact with the heat transmission spot of the internal casing. Therefore, when the heat of the coils is increased, the heat of the coils is transmitted to the heat transmission spot of the internal casing via the heat transmission portion. Thus, it is possible to reliably prevent the temperature of one pair of coils included in the light path changing element from being increased. Accordingly, since it is possible to reliably prevent the magnetic force of the coils included in the light path changing element from being reduced, it is possible to reliably stabilize the driving of the light path changing element.

In the aspect of the invention, it is preferable that the projector further includes a cooling device that is disposed in the internal casing and circulates a cooling gas in the internal casing, and a part of the cooling gas is circulated in the support member.

According to the aspect of the invention with this configuration, since the cooling device is disposed in the internal casing, it is possible to cool the light modulation device, the light path changing device, and the light combination device disposed in the internal casing. Since the cooling gas is circulated to the support member to which the heat of the coils is transmitted via the heat transmission portion, it is possible to reliably cool the support member. Accordingly, it is possible to prevent the temperature of one pair of coils included in the light path changing element from being increased.

BRIEF DESCRIPTION OF THE DRAWINGS

The invention will be described with reference to the accompanying drawings, wherein like numbers reference like elements.

FIG. 5 is a perspective view illustrating a shift element when viewed from a light incidence side according to the first embodiment.

FIG. 14 is a perspective view illustrating a shift element of a projector according to a third embodiment of the invention.

FIG. 21 is a schematic diagram illustrating an overall configuration of a circulation cooling device according to the embodiment.

DESCRIPTION OF EXEMPLARY EMBODIMENTS

First Embodiment

A first embodiment of the invention will be described with reference to the drawings.

Exterior Configuration of Projector

Figure 1:
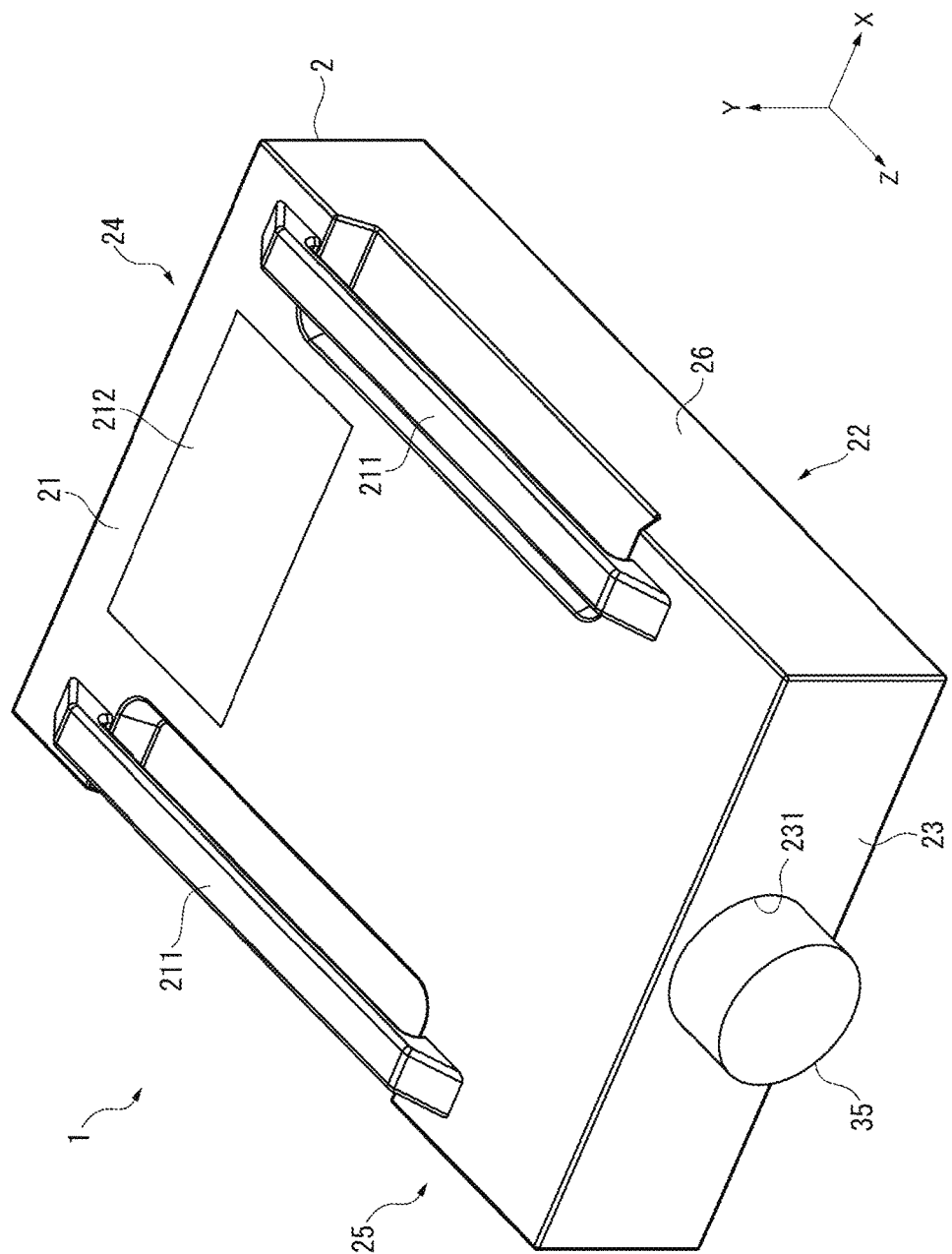
FIG. 1 is a schematic perspective view illustrating the exterior of a projector according to a first embodiment of the invention.

FIG. 1 is a schematic perspective view illustrating a projector 1 according to a first embodiment of the invention.

The projector 1 according to the embodiment is a projection type display apparatus that modulates light emitted from an illumination device 31 to be described below to form an image according to image information and expands and projects the image to a projection surface such as a screen.

The projector 1 includes a shift element 5 that changes a light path of incident light, as will be described below in detail. A cooling device has a function of cooling the shift element 5 in addition to a light modulation device to be described below.

As illustrated in FIG. 1, the projector 1 includes an exterior casing 2 that forms the exterior appearance.

The exterior casing 2 has a substantially rectangular parallelepiped shape that has a top surface 21, a bottom surface 22, a front surface 23, a rear surface 24, and left and right side surface portions 25 and 26.

In the top surface 21, an opening (not illustrated) is formed to detachably mount light source devices 31A and 31B to be described below on the inside of the exterior casing 2. The opening is covered with a cover member 212.

Although not illustrated, leg portions coming into contact with an installation surface of an installation stand when placed on the installation surface of the installation stand are installed on the bottom surface 22.

An opening 231 in which a part of the optical projection device 35 included in an image forming device 3 to be described below is exposed is formed in the front surface 23.

Although the others are not illustrated, an inlet port introducing an air outside the exterior casing 2 into the inside is formed on the right side surface 26, and an outlet port discharging the air inside the exterior casing 2 is formed on the left side surface 25.

Internal Configuration of Projector

Figure 2:
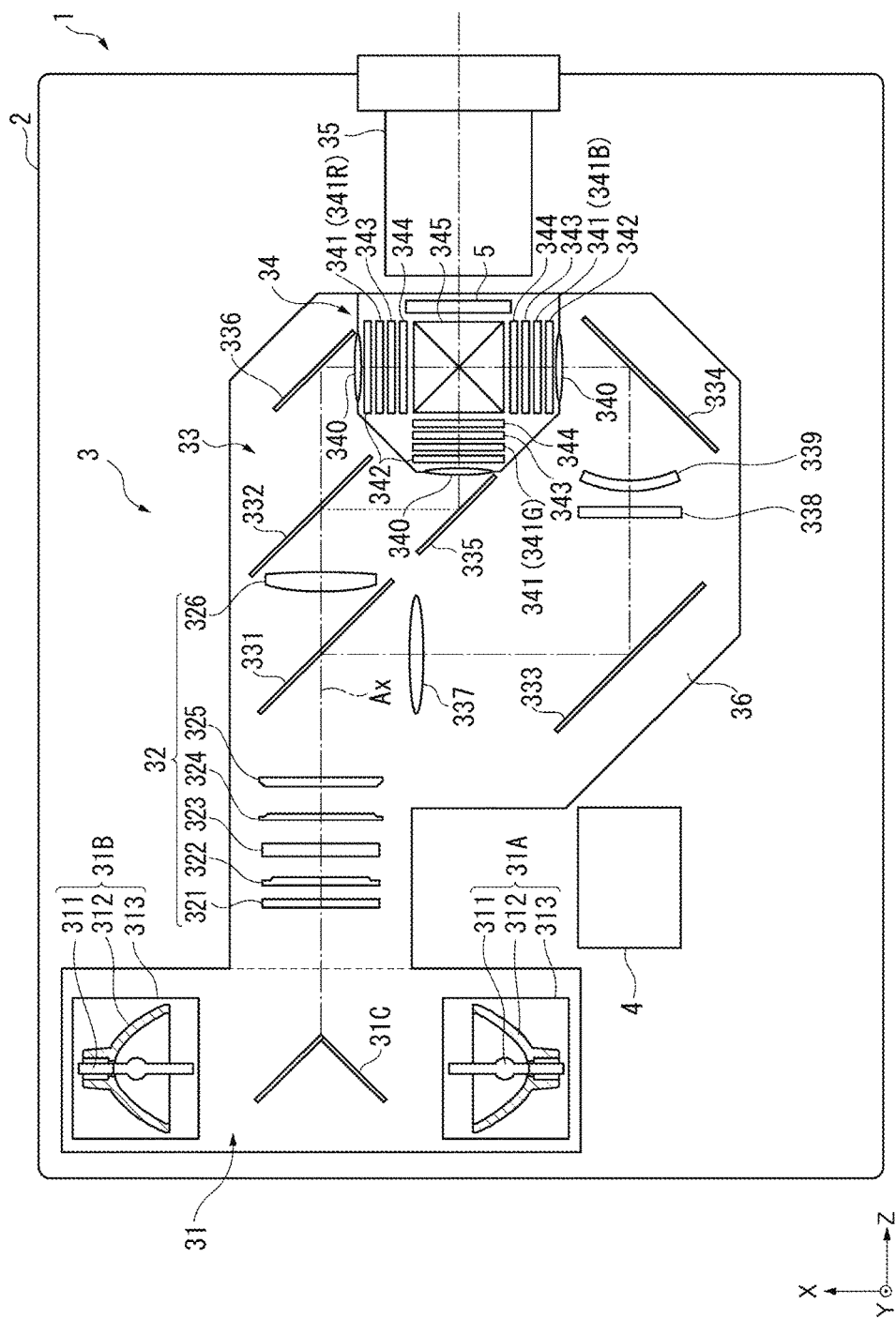
FIG. 2 is a schematic diagram illustrating an overall configuration of the projector according to the first embodiment.

FIG. 2 is a schematic diagram illustrating an internal configuration of the projector 1.

The projector 1 includes not only the exterior casing 2 but also an image forming device 3 and a cooling device 4 disposed in the exterior casing 2, as illustrated in FIG. 2. Additionally, although not illustrated, the projector 1 includes a control device that controls the projector 1 and a power device that supplies power to electronic components included in the projector 1.

Configuration of Image Forming Device

The image forming device 3 forms and projects an image according to image information input from the control device. The image forming device 3 includes an illumination device 31, a uniformalization device 32, a color separation device 33, an electric optical device 34, an optical projection device 35, and an optical component casing 36.

Of the devices, the optical component casing 36 is a box-like casing in which an illumination light axis Ax is set. The illumination device 31, the uniformalization device 32, and the color separation device 33 are disposed at positions on the illumination light axis Ax inside the optical component casing 36. The electric optical device 34 and the optical projection device 35 are located outside the optical component casing 36 and are disposed according to the illumination light axis Ax.

The illumination device 31 includes a pair of light source devices 31A and 31B and a reflection mirror 31C disposed between the pair of light source devices 31A and 31B.

The pair of light source devices 31A and 31B each include a light source lamp 311, a reflector 312, and a housing body 313 that houses the light source lamp 311 and the reflector 312. The light source devices 31A and 31B emit light toward the reflection mirror 31C.

The reflection mirror 31C reflects the light incident from the light source devices 31A and 31B in the same direction so that the light is accordingly incident on the uniformalization device 32.

The uniformalization device 32 uniformalizes illuminance in an orthogonal plane to a central axis of a light flux emitted from the illumination device 31. The uniformalization device 32 includes a cinema filter 321, a first lens array 322, a UV filter 323, a second lens array 324, a polarization conversion element 325, and a superimposition lens 326.

Of the elements, the polarization conversion element 325 arranges polarization directions of the incident light in one kind of direction.

The color separation device 33 separates the light flux incident from the uniformalization device 32 into three pieces of color light of red (R), green (G), and blue (B). The color separation device 33 includes dichroic mirrors 331 and 332, reflection mirrors 333 to 336, and relay lenses 337 to 339.

The electric optical device 34 modulates the pieces of separated color light according to image information, and then combines the pieces of modulated color light. The electric optical device 34 includes field lends 340, liquid crystal panels 341 (red, green, and blue liquid crystal panels are referred to as liquid crystal panels 341R, 341G, and 341B, respectively) serving as light modulation devices installed for the respective pieces of color light, incidence-side polarization plates 342, exit-side polarization plates 343, optical compensation plates 344, and one color combination device 345. Of the elements, the color combination device 345 corresponds to a light combination device according to the invention.

The shift element 5 increases the resolution of a projection image by periodically shifting a light path of light emitted by the color combination device 345.

The configurations of the electric optical device 34 and the shift element 5 will be described below in detail.

The optical projection device 35 is a projection lens that expands the light flux (which is a light flux forming an image) combined by the color combination device 345 and projects the light flux to the projection surface. An assembled lens in which a plurality of lenses are disposed in a barrel can be adopted as the optical projection device 35.

In the following drawings and description, a Z direction indicates a travelling direction (projection direction) of the light exited from the color combination device 345, and X and Y directions indicate directions orthogonal to the Z direction and orthogonal to each other. Of the directions, the Y direction indicates an upward side which is an opposite direction to the vertical direction (that is, a direction oriented from the bottom surface 22 to the top surface 21 of the exterior casing 2) in a case in which the projector 1 is disposed so that the Z direction is oriented in the horizontal direction in a plan view. The X direction indicates a direction oriented from the left to the right when viewed in the Z direction (light traveling direction).

Configuration of Electric Optical Device

Figure 3:
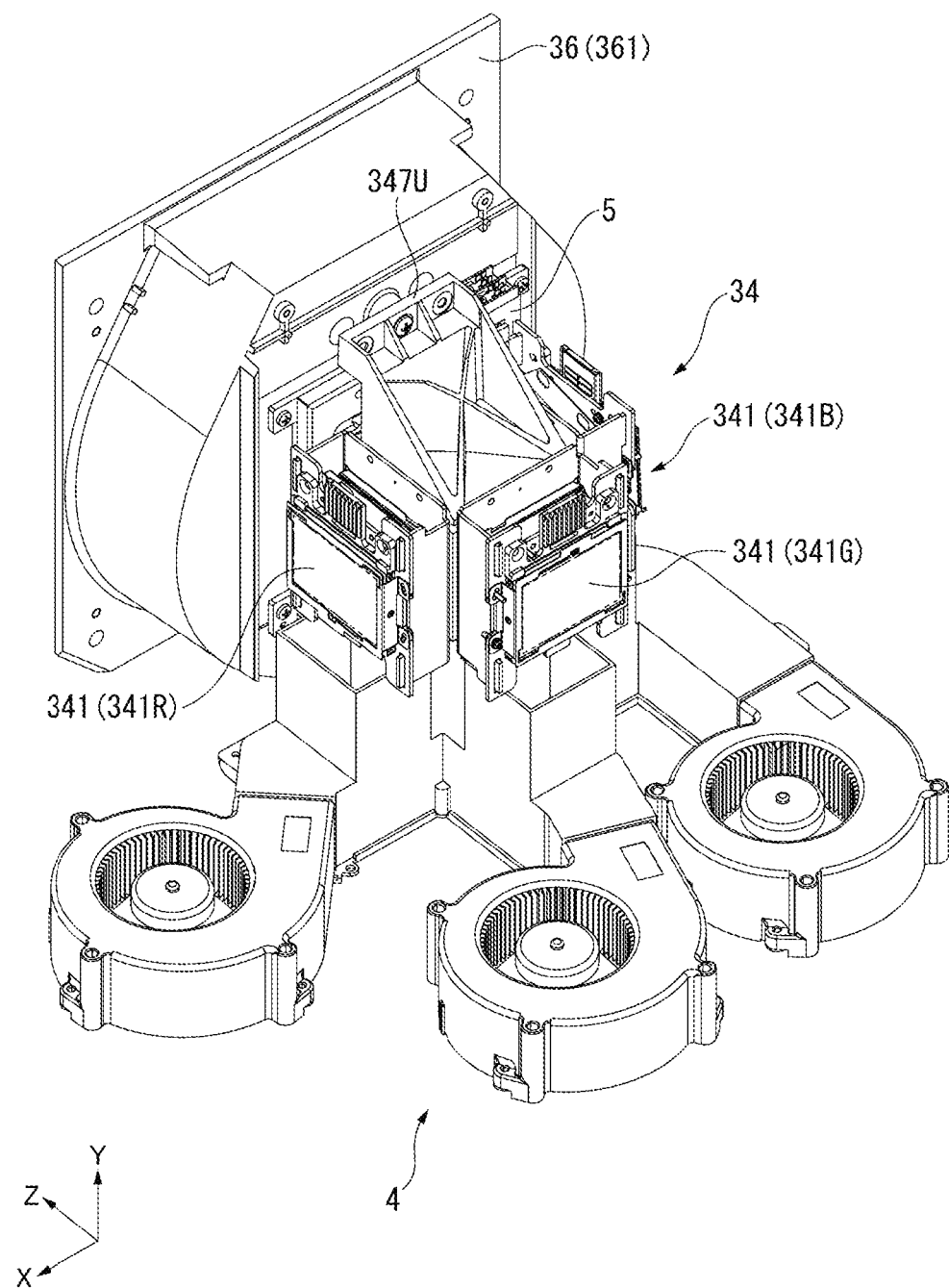
FIG. 3 is a perspective view illustrating an electric optical device and a cooling device of the projector according to the first embodiment.
Figure 4:
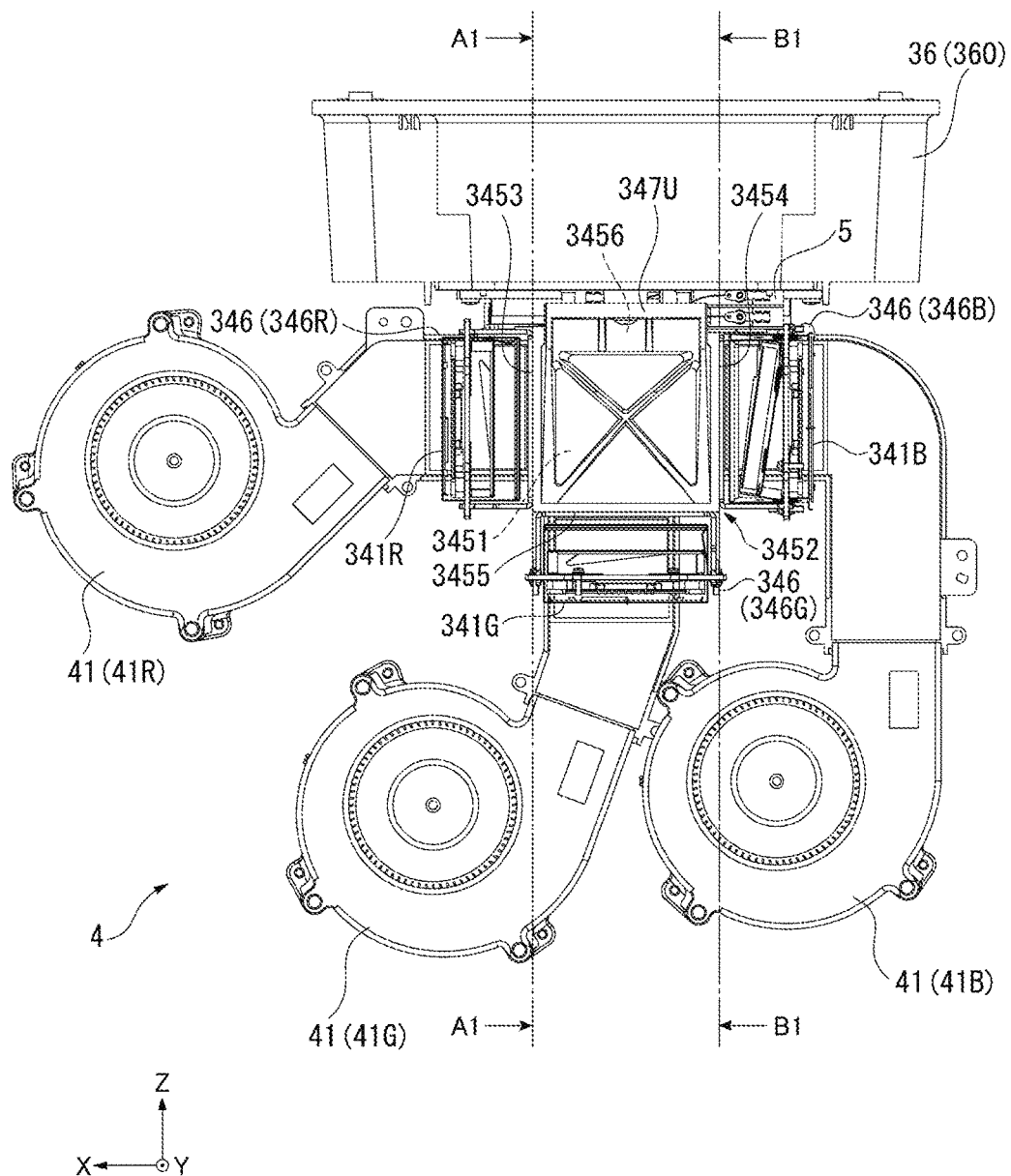
FIG. 4 is a plan view illustrating the electric optical device and the cooling device according to the first embodiment.

FIG. 3 is a perspective view illustrating the electric optical device 34 and the cooling device 4. FIG. 4 is a plan view illustrating the electric optical device 34 and the cooling device 4 when viewed in the Y direction. In FIGS. 3 and 4, the electric optical device 34 is illustrated in a state in which the field lenses 340 are detached.

Of the constituent elements of the electric optical device 34, the liquid crystal panels 341 (341R, 341G, and 341B), the exit-side polarization plates 343, and the optical compensation plates 344 are mounted on the color combination device 345 by holding members. The liquid crystal panels 341, the exit-side polarization plates 343, the optical compensation plates 344, and the color combination device 345 are configured to form an integrated prism unit, as illustrated in FIGS. 3 and 4.

The color combination device 345 configured to form the prism unit is configured by a substantially quadrangular cross dichroic prism. The color combination device 345 has six surfaces 3451 to 3456. Of the surfaces, prism bases 347U and 347L (see FIGS. 3 and 11) respectively come into contact with the surface 3451 in the Y direction of the color combination device 345 and the surface 3452 on the opposite side to the Y direction, and thus the color combination device 345 is supported.

The surface 3453 in the X direction of the color combination device 345, the surface 3454 on the opposite side in the X direction, and the surface 3455 on the opposite side in the Z direction are incidence surfaces of pieces of red, blue, and green modulated light. The surface 3456 in the Z direction is an exit surface. The liquid crystal panels 341R, 341G, and 341B are held by holding members 346 (a red holding member 346R, a green holding member 346G, and a red holding member 346B) to face the incidence surfaces (surfaces 3453 to 3455). Accordingly, the liquid crystal panels 341, the incidence-side polarization plates 342, the exit-side polarization plates 343, and the optical compensation plates 344 can be integrated.

Configuration of Shift Element

FIG. 5 is a perspective view illustrating a fixing member 360 and the shift element 5 when viewed in the opposite direction to the Z direction.

The fixing member 360 is a portion that forms a part of the optical component casing 36 and fixes the shift element 5. The fixing member 360 is disposed at a position facing the optical projection device 35 in the optical component casing 36. The shift element 5 is fixed to a surface 3601 in the opposite direction to the Z direction of the fixing member 360, as illustrated in FIG. 5. Specifically, the shift element 5 is fixed to the fixing member 360 so that the shift element 5 is fixed to be disposed between the color combination device 345 and the optical projection device 35.

Figure 6:
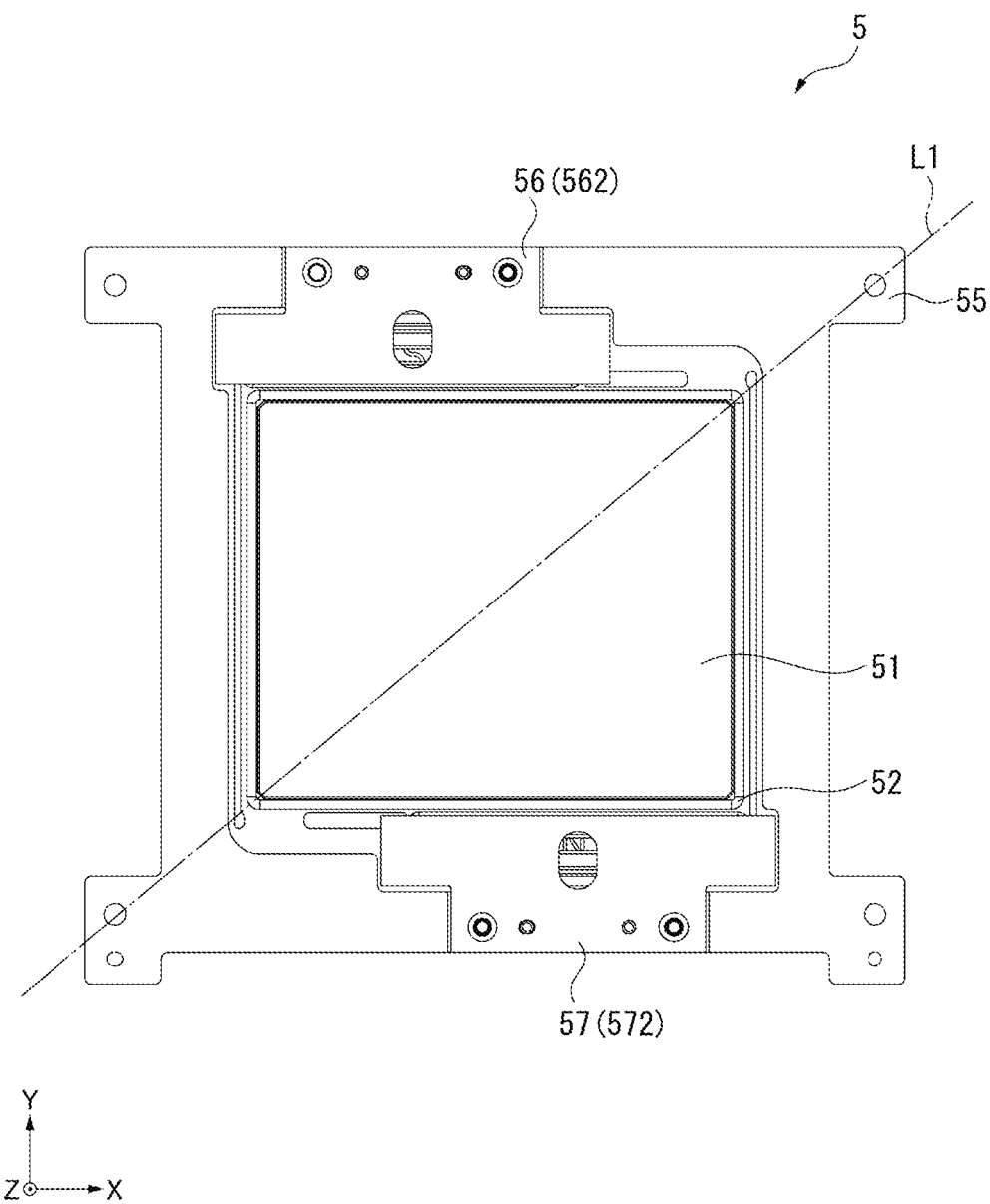
FIG. 6 is a plan view illustrating the shift element when viewed from a light exit side according to the first embodiment.
Figure 7:
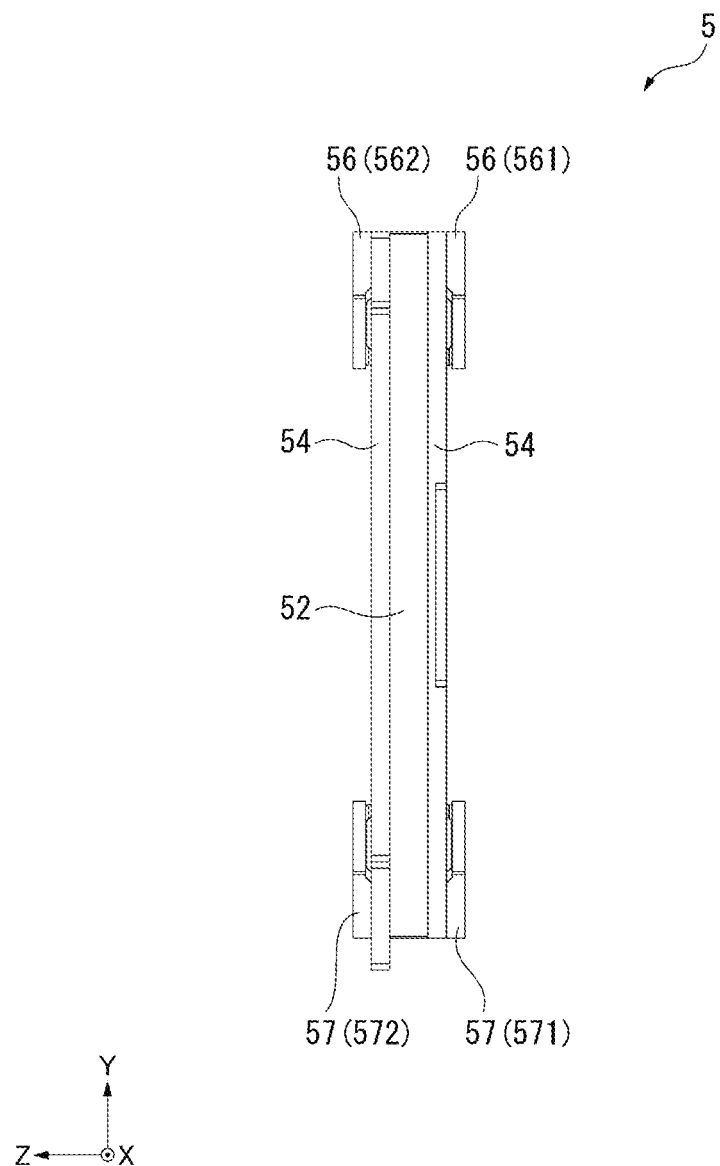
FIG. 7 is a side view illustrating the shift element according to the first embodiment.
Figure 8:
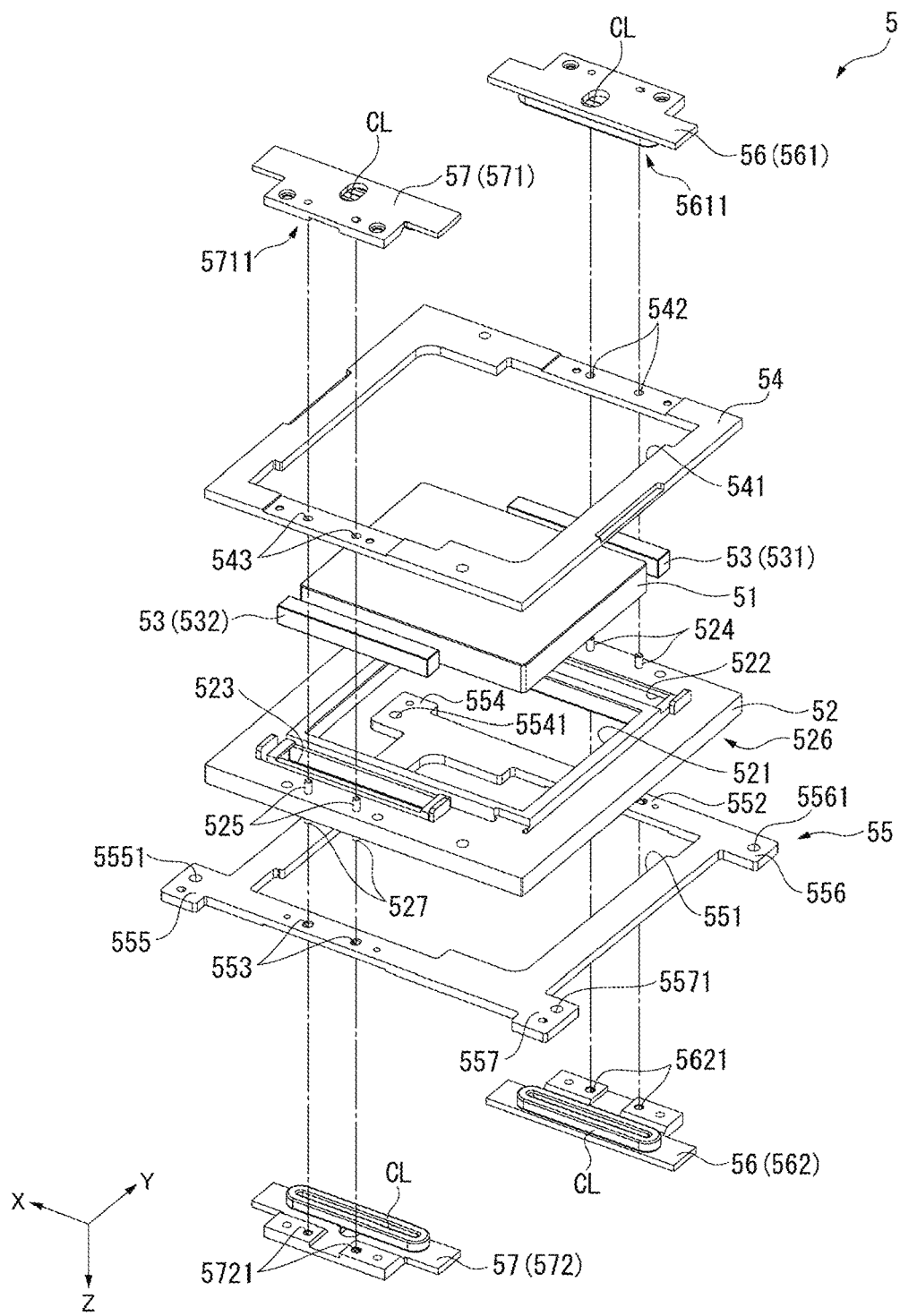
FIG. 8 is an exploded perspective view illustrating the shift element according to the first embodiment.

FIG. 6 is a plan view illustrating the shift element 5 when viewed in the Z direction. FIG. 7 is a side view illustrating the shift element 5 when viewed in the X direction. FIG. 8 is an exploded perspective view illustrating the shift element 5.

The shift element 5 corresponds to a light path changing element according to the invention and has a function of changing (shifting) a light path of the light incident on the shift element 5 and exited from the shift element 5 through fluctuation of the shift element 5. As illustrated in FIGS. 5 to 8, the shift element 5 includes an optical member 51, a rim 52, permanent magnets 53, a first frame 54, a second frame 55, and pairs of coil holding portions 56 and 57.

Of the elements, the optical member 51 is configured as a transparent member that has transmittance and is configured of a rectangular plate glass in the embodiment.

Configuration of Rim

The rim 52 has a function of holding the optical member 51 and the permanent magnets 53. As illustrated in FIG. 5, the rim 52 is configured in a rectangular plate shape that has four corners CR1 to CR4. An opening 521 in which the optical member 51 is inserted is formed in the substantially middle portion of the rim 52, as illustrated in FIG. 8. Fitting grooves 522 and 523 in which the permanent magnets 53 are inserted are formed at a position in the Y direction of the opening 521 of the rim 52 and a position in the opposite direction to the Y direction. Of the fitting grooves 522 and 523, the fitting groove 522 is formed in the opposite direction to the X direction relative to the fitting groove 523.

Positioning protrusions 524 protruding in the opposite direction to the Z direction are formed at end edges in the Y direction of the fitting groove 522 of the rim 52 and in the opposite direction to the X direction. Positioning protrusions 525 protruding in the opposite direction to the Z direction are formed at end edges in the opposite direction to the Y direction of the fitting groove 523 of the rim 52 and in the X direction. Further, positioning protrusions 526 and 527 protruding in the Z direction are formed at position corresponding to the positioning protrusions 524 and 525 on the surface of the rim 52 in the Z direction.

In other words, the positioning protrusions 524 and 526 in the Y direction are formed near the corner CR3 among the four corners CR1 to CR4 of the rim 52. The positioning protrusions 525 and 527 in the opposite direction to the Y direction are formed near the corner CR2 which is a diagonal corner of the corner CR3.

As illustrated in FIG. 8, the permanent magnets 53 are formed in a rectangular column shape. The permanent magnet 53 (permanent magnet 531) is fitted in the fitting groove 522 and the permanent magnet 53 (permanent magnet 532) is fitted in the fitting groove 523. In this way, the permanent magnets 531 and 532 are fixed to the rim 52.

Configuration of First Frame

The first frame 54 is disposed in the opposite direction to the Z direction of the rim 52 and has a function of interposing the rim 52 along with the second frame 55. The first frame 54 is formed in a rectangular plate shape and an opening 541 is formed in the substantially middle of the first frame 54. The opening 541 is formed in substantially the same shape as the optical member 51. Accordingly, light incident from the opening 541 is incident on the optical member 51.

Through holes 542 are formed at end edges in the Y direction of the first frame 54 and in the opposite direction to the X direction, and through holes 543 are formed at end edges in the opposite direction to the Y direction of the first frame 54 and in the X direction. The positioning protrusions 524 of the rim 52 are inserted into the through holes 542 and the positioning protrusions 525 are inserted into the through holes 543.

Configuration of Second Frame

The second frame 55 is disposed in the Z direction of the rim 52 and has a function of interposing the rim 52 along with the first frame 54. The second frame 55 is formed in a rectangular plate shape and an opening 551 is formed in the substantially middle of the second frame 55. The opening 551 is formed in substantially the same shape as the optical member 51.

Through holes 552 are formed at end edges in the Y direction of the second frame 55 and in the opposite direction to the X direction, and through holes 553 are formed at end edges in the opposite direction to the Y direction of the second frame 55 and in the X direction. The positioning protrusions 526 of the rim 52 are inserted into the through holes 552 and the positioning protrusions 527 are inserted into the through holes 553.

The second frame 55 further includes extensions 554 to 557 extending from the corners to the outside of the second frame 55. Through holes 5541, 5551, 5561, and 5571 through which screws S1 are inserted are formed in the extensions 554 to 557. By screwing the screws S1 to the fixing member 360, the shift element 5 is fixed to the fixing member 360, as illustrated in FIG. 5.

In this configuration, the first frame 54 and the second frame 55 interpose the rim 52. The rim 52, the first frame 54, and the second frame 55 correspond to a rim according to the invention.

Configuration of Coil Holding Portions

One pair of coil holding portions 56 and one pair of coil holding portions 57 each include an air-core coil CL corresponding to a coil according to the invention therein. When power is supplied to the air-core coil CL, the air-core coil CL displaces the permanent magnet 53 and further generates a magnetic force that displaces the shift element 5. Of the portions, one pair of coil holding portions 56 includes a coil holding portion 561 fixed to the first frame 54 and a coil holding portion 562 fixed to the second frame 55.

Holes 5611 and 5621 are formed in the coil holding portions 561 and 562, respectively. The positioning protrusions 524 of the rim 52 are fitted into the holes 5611 through the through holes 542 of the first frame 54. On the other hand, the positioning protrusions 526 of the rim 52 are fitted into the holes 5621 through the through holes 552 of the second frame 55. Accordingly, the coil holding portion 561 is fixed to the first frame 54 and the coil holding portion 562 is fixed to the second frame 55.

One pair of coil holding portions 57 includes a coil holding portion 571 fixed to the first frame 54 and a coil holding portion 572 fixed to the second frame 55. Holes 5711 and 5721 are formed in the coil holding portions 571 and 572, respectively. The positioning protrusions 525 of the rim 52 are fitted into the holes 5711 through the through holes 543 of the first frame 54. On the other hand, the positioning protrusions 527 of the rim 52 are fitted into the holes 5721 through the through holes 553 of the second frame 55. Accordingly, the coil holding portion 571 is fixed to the first frame 54 and the coil holding portion 572 is fixed to the second frame 55.

One pair of coil holding portions 56, the air-core coil CL included in the one pair of coil holding portions 56, and the permanent magnet 531 correspond to one fluctuation member according to the invention. One pair of coil holding portions 57, the air-core coil CL included in the one pair of coil holding portions 57, and the permanent magnet 532 correspond to the other fluctuation member according to the invention.

In this way, the coil holding portions 561 and 562 of one pair of coil holding portions 56 are disposed near the corner CR3 in the Y direction in the opposite direction to the X direction and at superimposing positions and orientation. On the other hand, the coil holding portions 571 and 572 of one pair of coil holding portions 57 are disposed near the corner CR2 in the X direction and the opposite direction to the Y direction and at superimposing positions and orientation in a case in which the shift element 5 is viewed in the Z direction. In other words, when the shift element 5 fixed to the fixing member 360 is viewed in the opposite direction to the Z direction, one pair of coil holding portions 56 are disposed on the side of the liquid crystal panel 341B and one pair of coil holding portions 57 are disposed on the side of the liquid crystal panel 341R.

The rim 52, the first frame 54, and the second frame 55, one pair of coil holding portions 56, and one pair of coil holding portions 57 are formed of metal having heat conductivity and are formed of aluminum in the embodiment. Accordingly, in a case in which the temperature of the air-core coil CL increases, heat of the rim 52, the first frame 54, the second frame 55, and the air-core coils CL of one pair of coil holding portions 56 and one pair of coil holding portions 57 is transmitted.

Power supply portions 3602 mounted on the fixing member 360 are connected to the coil holding portions 561, 562, 571, and 572 (see FIG. 5). The power supply portions 3602 supply power to the air-core coils CL via the coil holding portions 561, 562, 571, and 572 to displace the permanent magnets 531 and 532 and further generate a magnetic force to displace the shift element 5.

Specifically, when the permanent magnets 531 and 532 mounted on the rim 52 are displaced, the shift element 5 is moved in approaching and separating directions relative to the surface 3601 of the fixing member 360 at a rotational angle L1 illustrated in FIG. 6, so that the angle of the optical member 51 is inserted into the opening 521 of the rim 52 is changed.

In other words, by supplying power to the coil holding portions 561, 562, 571, and 572, it is possible to change the light path of the light incident on the optical member 51 and exited from the optical member 51.

Configuration of Cooling Device

Figure 9:
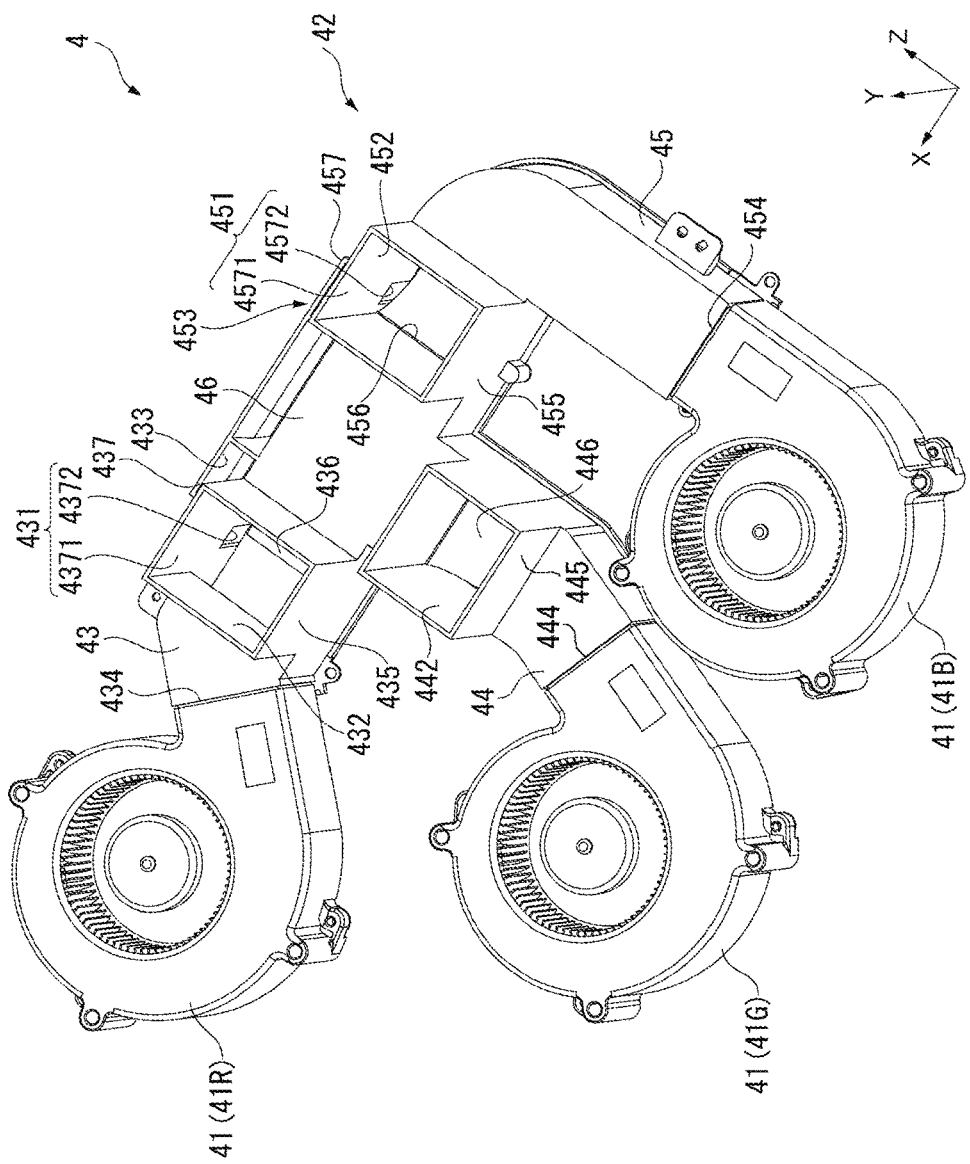
FIG. 9 is a perspective view illustrating a cooling device according to the first embodiment.
Figure 10:
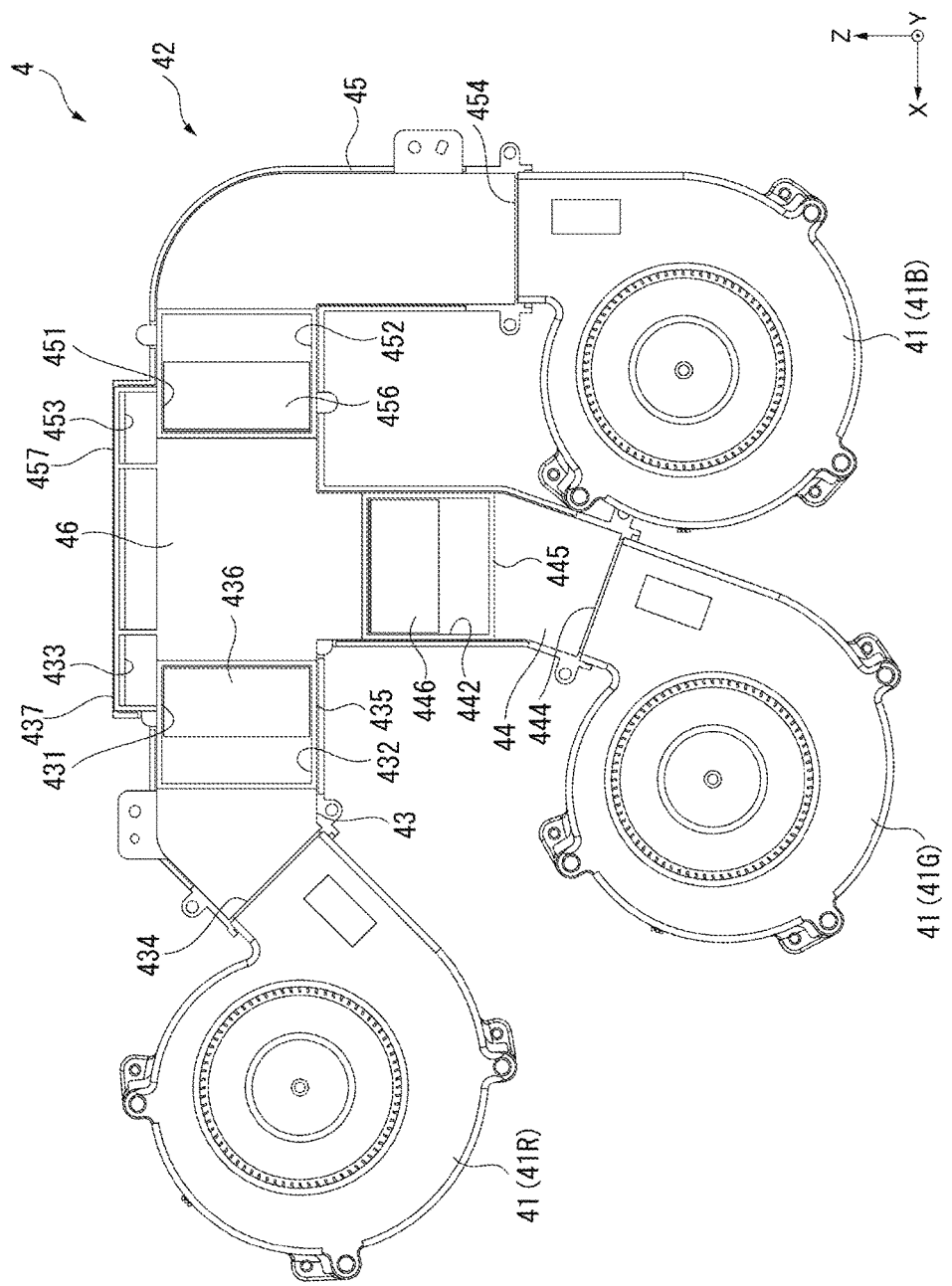
FIG. 10 is a plan view illustrating the cooling device according to the first embodiment.

FIG. 9 is a perspective view illustrating the cooling device 4 when viewed in the Y direction. FIG. 10 is a plan view illustrating the cooling device 4 when viewed in the Y direction.

The cooling device 4 has a function of sending a cooling gas to cool the liquid crystal panels 341 (341R, 341G, and 341B) and the shift element 5. As illustrated in FIGS. 9 and 10, the cooling device 4 includes cooling fans 41 (cooling fans corresponding to the liquid crystal panels 341R, 341G, and 341B are referred to as cooling fans 41R, 41G, and 41B) and a duct member 42. Of these elements, the cooling fan 41 sucks the cooling gas around the cooling fan 41 and supplies the cooling gas to the liquid crystal panel 341 and the shift element 5 via the duct member 42.

The cooling fan 41 is configured by a sirocco fan. However, the invention is not limited thereto. The cooling fan 41 may be configured by an axial fan.

Configuration of Duct Member

The duct member 42 guides the cooling gas sent from each cooling fan 41 not only to the corresponding liquid crystal panel 341, the corresponding incidence-side polarization plate 342, the corresponding exit-side polarization plate 343, and the corresponding optical compensation plate 344 but also to the shift element 5. The duct member 42 includes a first duct portion 43, a second duct portion 44, a third duct portion 45, and a connection portion 46.

Configuration of First Duct Portion

The first duct portion 43 has a function of supplying the cooling gas from the cooling fan 41R to the liquid crystal panel 341R and the coil holding portion 57 in the shift element 5. The first duct portion 43 includes a branch portion 431, a sending port 432 that sends the partial cooling gas branched by the branch portion 431 to the red liquid crystal panel 341R, and a sending port 433 that sends the other branched partial cooling gas to the coil holding portion 57 of the shift element 5.

An end 434 of the first duct portion 43 in the X direction is connected to an ejection port of the cooling fan 41R. A protrusion 435 of the first duct portion 43 has a shape extending in the Y direction and the sending port 432 is formed at the end of the protrusion 435 in the Y direction. A rectification portion 436 is installed at the end of the protrusion 435 in the opposite direction to the Y direction. The rectification portion 436 is formed in a substantially arc shape and has a function of circulating the cooling gas from the cooling fan 41R smoothly in the Y direction.

The sending port 432 is disposed at a position corresponding to the liquid crystal panel 341R. Accordingly, the cooling gas is circulated to the liquid crystal panel 341R through the sending port 432.

As illustrated in FIGS. 9 and 10, the first duct portion 43 has an extension 437 extending from the branch portion 431 in the Z direction. The sending port 433 is formed in the extension 437. An opening 4372 is formed in a surface 4371 of the extension 437 in the opposite direction to the Z direction. A part of the cooling gas supplied from the cooling fan 41R is circulated in the opening 4372. That is, the branch portion 431 is formed by the surface 4371 and the opening 4372.

The sending port 433 corresponds to a sending port according to the invention and is disposed at a position facing the coil holding portion 57 of the shift element 5.

Configuration of Second Duct Portion

The second duct portion 44 has a function of supplying the cooling gas from the cooling fan 41G to the liquid crystal panel 341G. The second duct portion 44 includes a sending port 442 that sends the cooling gas to the green liquid crystal panel 341G.

An end 444 of the second duct portion 44 in the opposite direction to the Z direction is connected to an ejection port of the cooling fan 41G. The sending port 442 is formed in a protrusion 445 of the second duct portion 44. A rectification portion 446 is installed at the end of the protrusion 445 in the opposite direction to the Y direction. The rectification portion 446 is formed in a substantially arc shape and has a function of circulating the cooling gas from the cooling fan 41G smoothly in the Y direction.

The sending port 442 is disposed at a position corresponding to the liquid crystal panel 341G. Accordingly, the cooling gas is circulated to the liquid crystal panel 341G through the sending port 442.

Configuration of Third Duct Portion

The third duct portion 45 has a function of supplying the cooling gas from the cooling fan 41B to the liquid crystal panel 341B and the coil holding portion 56 in the shift element 5. The third duct portion 45 includes a branch portion 451, a sending port 452 that sends the partial cooling gas branched by the branch portion 451 to the blue liquid crystal panel 341B, and a sending port 453 that sends the other branched partial cooling gas to the coil holding portion 56 of the shift element 5.

An end 454 of the third duct portion 45 in the opposite direction to the Z direction is connected to an ejection port of the cooling fan 41B. A protrusion 455 of the third duct portion 45 has a shape extending in the Y direction and the sending port 452 is formed at the end of the protrusion 455 in the Y direction. A rectification portion 456 is installed at the end of the protrusion 455 in the opposite direction to the Y direction. The rectification portion 456 is formed in a substantially arc shape and has a function of circulating the cooling gas from the cooling fan 41B smoothly in the Y direction.

The sending port 452 is disposed at a position corresponding to the liquid crystal panel 341B. Accordingly, the cooling gas is circulated to the liquid crystal panel 341B through the sending port 452.

As illustrated in FIGS. 9 and 10, the third duct portion 45 has an extension 457 extending from the branch portion 451 in the Z direction. The sending port 453 is formed in the extension 457. An opening 4572 is formed in a surface 4571 of the extension 457 in the opposite direction to the Z direction. A part of the cooling gas supplied from the cooling fan 41B is circulated in the opening 4572. That is, the branch portion 451 is formed by the surface 4571 and the opening 4572.

The sending port 453 corresponds to a sending port according to the invention and is disposed at a position facing the coil holding portion 56 of the shift element 5.

Circulation Direction of Cooling Gas

Figure 11:
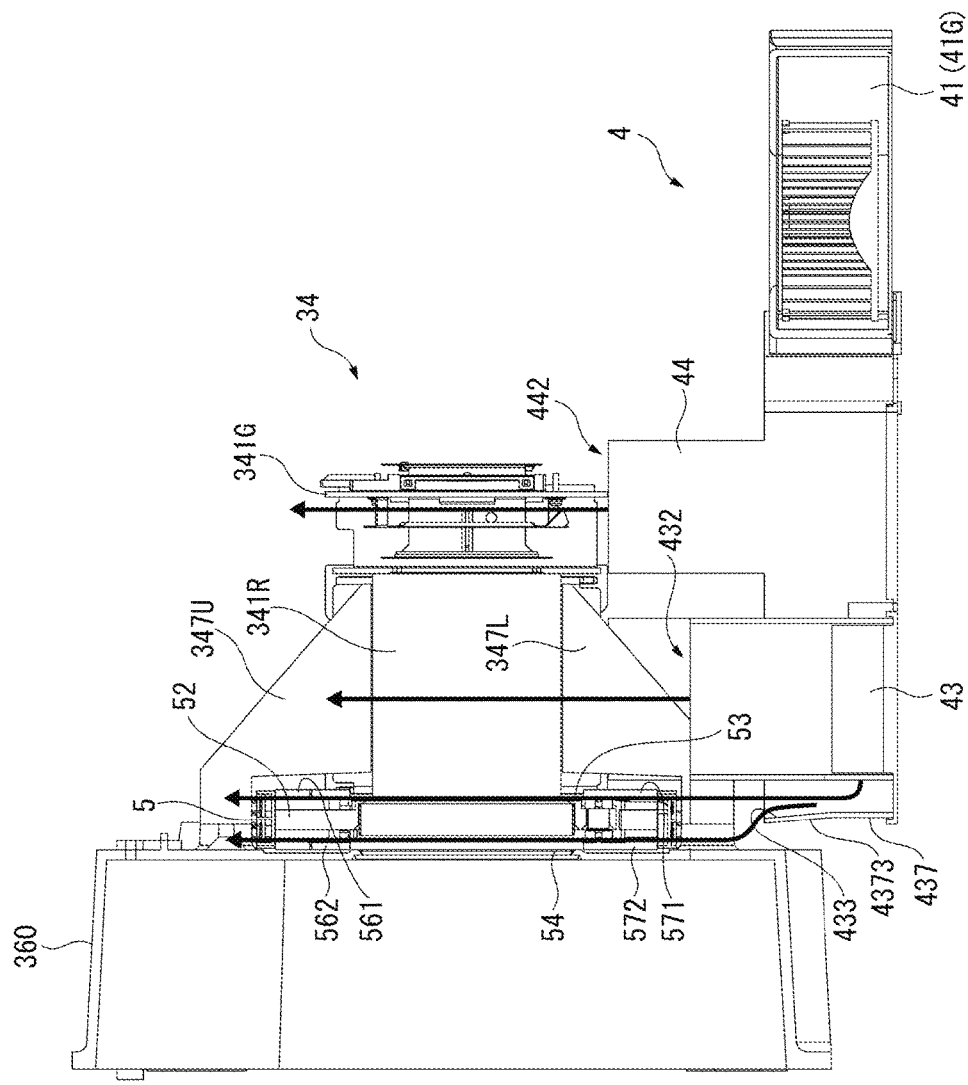
FIG. 11 is a sectional view illustrating the cross-sectional surfaces of the electric optical device, the shift element, and the cooling device on a red light side according to the first embodiment.
Figure 12:
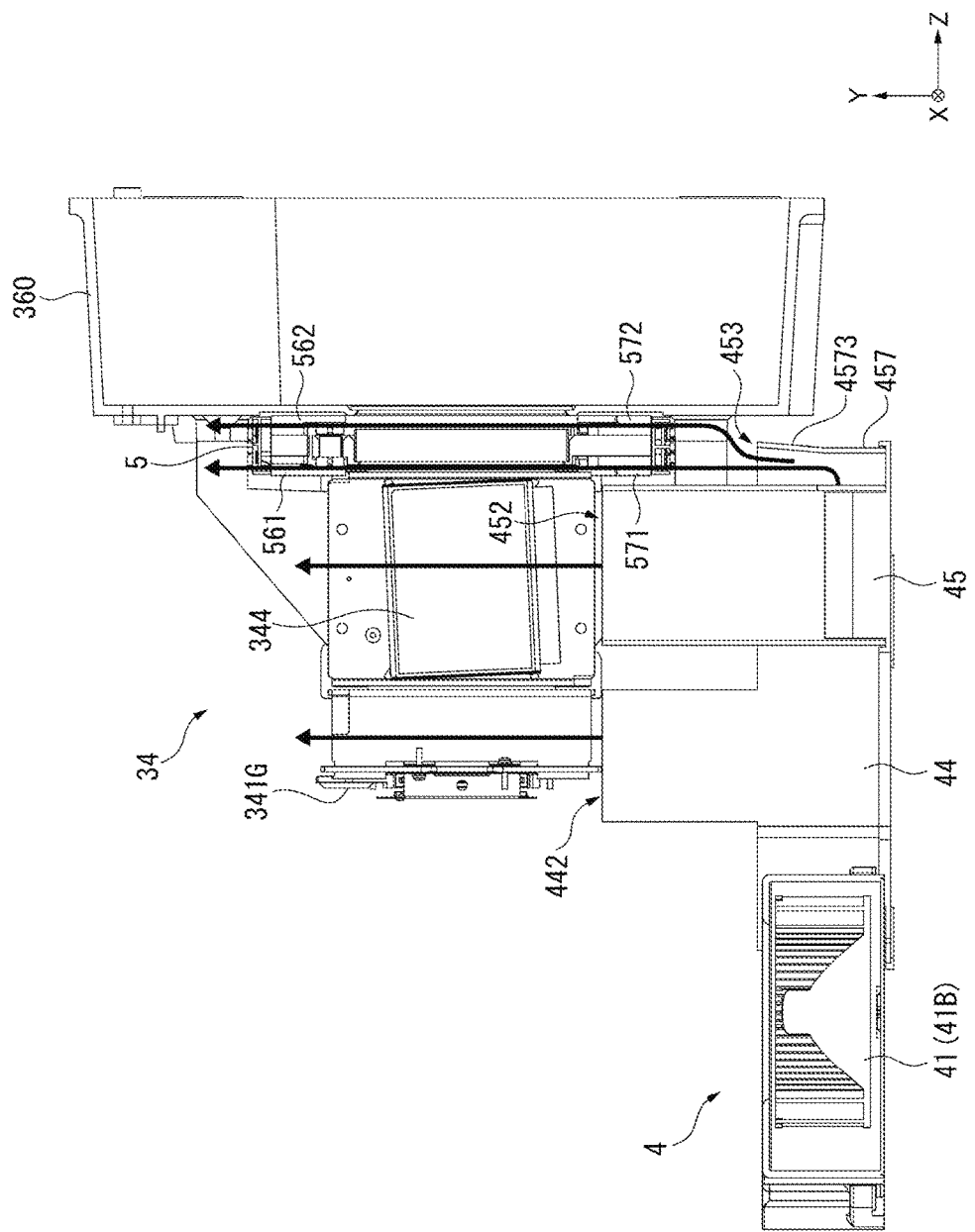
FIG. 12 is a sectional view illustrating the cross-sectional surfaces of the electric optical device, the shift element, and the cooling device on a blue light side according to the first embodiment.

FIG. 11 is a sectional view illustrating a cross-sectional surface taken along the line A1-A1 of FIG. 4 when the electric optical device 34 and the cooling device 4 are cut. FIG. 12 is a sectional view illustrating a cross-sectional surface taken along the line B1-B1 of FIG. 4 when the electric optical device 34 and the cooling device 4 are cut.

The cooling gas sent from the cooling fan 41G is sent in the Y direction from the sending port 442 via the second duct portion 44 to be supplied to the liquid crystal panel 341G, as illustrated in FIGS. 11 and 12.

The cooling gas sent from the cooling fan 41R is introduced into the first duct portion 43, as illustrated in FIG. 11. Of the cooling gas, the partial cooling gas branched by the branch portion 431 is sent from the sending port 432 in the Y direction to be supplied to the liquid crystal panel 341R. On the other hand, the other partial cooling gas branched by the branch portion 431 is circulated in the extension 437, is sent in the Y direction from the sending port 433 formed in the extension 437, and is supplied to a region of the shift element 5 in the X direction.

Here, a rectification portion 4373 inclined in the Z direction is formed at the end of the extension 437 in the Z direction, as illustrated in FIG. 11. Therefore, the cooling gas circulated in the extension 437 is spread to be sent in the Z direction when the cooling gas is sent from the sending port 433. Specifically, the cooling gas sent from the sending port 433 is circulated to a surface of the shift element 5 in the Z direction and a surface of the shift element 5 in the opposite direction to the Z direction. More specifically, the cooling gas sent from the sending port 433 is circulated to a surface of the coil holding portion 571 in the opposite direction to the Z direction and a surface of the coil holding portion 572 in the Z direction.

The cooling gas sent from the cooling fan 41B is introduced into the third duct portion 45, as illustrated in FIG. 12. Of the cooling gas, the partial cooling gas branched by the branch portion 451 is sent from the sending port 452 in the Y direction to be supplied to the liquid crystal panel 341B. On the other hand, the other partial cooling gas branched by the branch portion 451 is circulated in the extension 457, is sent in the Y direction from the sending port 453 formed in the extension 457, and is supplied to a region of the shift element 5 in the X direction.

Here, a rectification portion 4573 inclined in the Z direction is formed at the end of the extension 457 in the Z direction, as illustrated in FIG. 12. Therefore, the cooling gas circulated in the extension 457 is spread to be sent in the Z direction when the cooling gas is sent from the sending port 453. Specifically, the cooling gas sent from the sending port 453 is circulated to a surface of the shift element 5 in the Z direction and a surface of the shift element 5 in the opposite direction to the Z direction. More specifically, the cooling gas sent from the sending port 453 is circulated to a surface of the coil holding portion 571 in the opposite direction to the Z direction and a surface of the coil holding portion 572 in the Z direction.

In this way, the cooling gases circulated in the region of the shift element 5 in the X direction and the region in the opposite direction to the X direction are circulated along the coil holding portions 56 and 57 to cool the coil holding portions 56 and 57 (particularly, the air-core coils CL) and also cool the permanent magnet 53 interposed between the coil holding portions 56 and 57. In this way, the shift element 5 is cooled, and thus driving of the shift element 5 is stabilized.

Advantages of First Embodiment

There are the following advantages of the projector 1 according to the above-described embodiment.

Since the cooling gas can be supplied to the liquid crystal panels 341 and the shift element 5 which are the plurality of cooling targets, it is possible to prevent the temperature of the liquid crystal panels 341 from being increased. Since the shift element 5 is cooled by the cooling device 4, it is possible to prevent the temperature of the shift element 5 from being increased due to light incident from the liquid crystal panels 341.

Since the shift element 5 is disposed between the color combination device 345 and the optical projection device 35, the color combination device 345 can also be cooled along with the shift element 5 at the time of the cooling of the shift element 5. Accordingly, it is possible to prevent the temperature of the shift element 5 from being increased by light incident from the color combination device 345.

Since the duct member 42 circulating the cooling gas in the liquid crystal panels 341 includes the sending ports 433 and 453, it is not necessary to separately provide a cooling device cooling the shift element 5. Thus, it is possible to miniaturize the cooling device 4 and further miniaturize the projector 1.

Here, when power is supplied to one pair of air-core coils CL disposed with the permanent magnet 53 interposed therebetween, the permanent magnet 53 is displaced, the magnetic force displacing the shift element 5 is generated, and thus the temperature of the air-core coils CL is increased. Thus, when the temperature of the air-core coils CL is increased, the magnetic force of the air-core coils CL generating the magnetic force is weakened in some cases.

In the embodiment, however, since the cooling gas is supplied to the shift element 5, it is possible to prevent the temperature of the shift element 5, that is, one pair of air-core coils CL included in the shift element 5, from being increased. Accordingly, since the reduction in the magnetic force of the air-core coils CL installed in the shift element 5 can be suppressed, it is possible to stabilize driving of the shift element 5.

The air-core coils CL are fixed to the first frame 54 and the second frame 55 forming the holding portions of the shift element 5 to be held by one pair of coil holding portions 56 and one pair of coil holding portions 57, and at least part of the cooling gas is circulated in the coil holding portions 56 and 57. Therefore, it is possible to cool the coil holding portions 56 and 57. Accordingly, by cooling the coil holding portions 56 and 57, it is possible to cool the air-core coils CL held by the coil holding portions 56 and 57, and thus it is possible to prevent the temperature of the air-core coils CL from being increased.

The cooling gas can be supplied to the liquid crystal panels 341R and 341B and the shift element 5 via the two duct portions 43 and 45 according to the liquid crystal panels 341R and 341B disposed to be opposite to each other with the color combination device 345 interposed therebetween. That is, since the cooling gas is supplied from the two sending ports 433 and 453 to the shift element 5, it is possible to reliably cool the shift element 5. Since the cooling gas can be supplied to the liquid crystal panels 341 and the shift element 5 without further providing a duct that circulates a cooling gas to the shift element 5, it is possible to miniaturize the cooling device 4 and further miniaturize the projector 1.

The positions of the air-core coil CL, one pair of coil holding portions 56, and the permanent magnet 531 forming one fluctuation member are close to the position of one liquid crystal panel 341B. The positions of the air-core coil CL, one pair of coil holding portions 57, and the permanent magnet 532 forming the other fluctuation member are close to the position of the other liquid crystal panel 341R. Therefore, since the position of each of the liquid crystal panels 341R and 341B disposed to face one another is close to the position of each of the fluctuation members, it is possible to simplify the configuration of the branch portions 431 and 451 that circulate the cooling gas from the duct portions 43 and 45 corresponding to the closely disposed liquid crystal panels 341R and 341B to the fluctuation member. Since the distances from the branch portions 431 and 451 of the duct portions 43 and 45 to the sending ports 433 and 453 can be shortened, it is possible to suppress a reduction of a circulation speed of the cooling gas circulated in the duct portions 43 and 45. Accordingly, it is possible to cool the shift element 5 more reliably.

Second Embodiment

Next, a second embodiment of the invention will be described.

A projector 1A according to the embodiment has the same configuration as the projector 1, but is different from the projector 1 in that the shape of a shift element included in an electric optical device is different. In the following description, the same reference numerals are given to the same portions as the above-described portions or substantially the same portions and the description thereof will be omitted.

Figure 13:
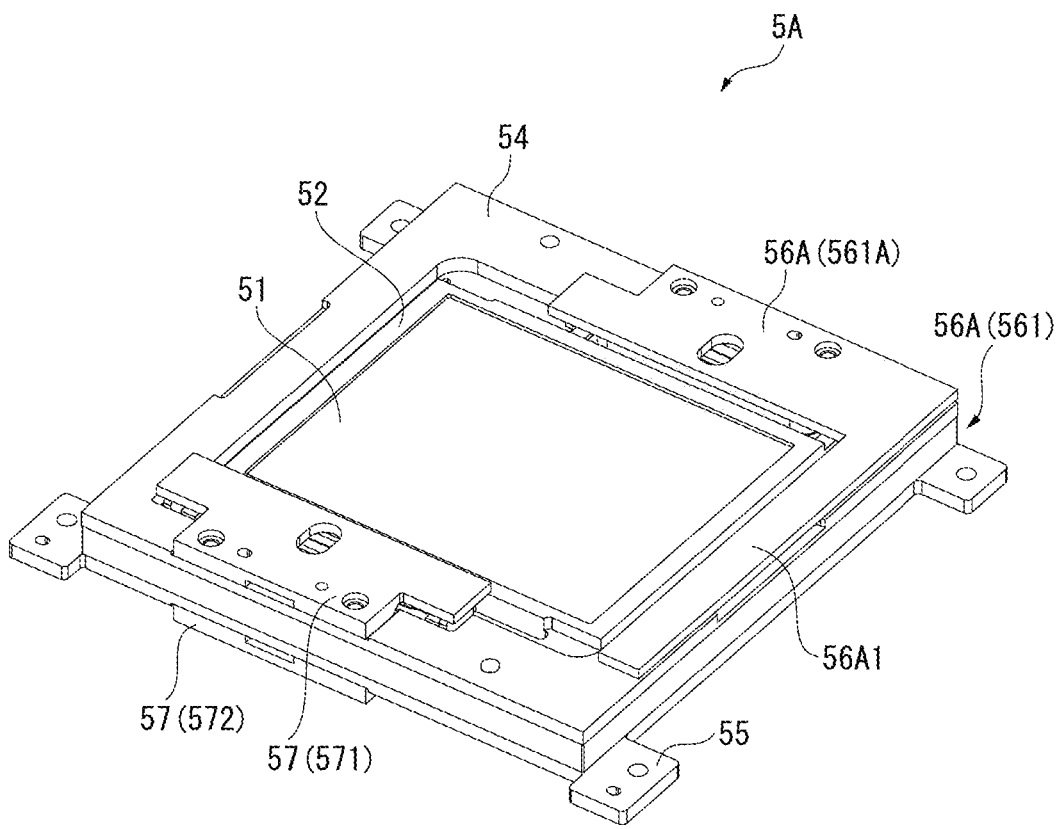
FIG. 13 is a perspective view illustrating a shift element of a projector according to a second embodiment of the invention.

FIG. 13 is a perspective view illustrating a shift element 5A of the projector 1A according to the embodiment.

The shift element 5A corresponds to a light path changing element according to the invention and has a function of changing a light path of incident light. The shift element 5A includes an optical member 51, a rim 52, permanent magnets (not illustrated), a first frame 54, a second frame 55, one pair of coil holding portions 56A, and one pair of coil holding portions 57, as illustrated in FIG. 13. In the embodiment, only the configuration of the coil holding portions 56A is different. Therefore, only the coil holding portions 56A will be described below in detail.

One pair of coil holding portions 56A include an air-core coil CL therein and are formed of aluminum having heat conductivity, as in the coil holding portions 56. In the one pair of coil holding portions 56A, a coil holding portion 561A in the opposite direction to the Z direction is formed in a substantial L shape, as illustrated in FIG. 13. Specifically, the coil holding portion 561A includes an extension 56A1 extending along the side edge of the first frame 54 in the opposite direction to the X direction on the side of the sending port 453, that is, in the opposite direction to the Y direction. In this configuration, a heat radiation area of the coil holding portion 561A is greater than heat radiation areas of the other coil holding portions 562, 571, and 572.

When a cooling gas is sent from the sending port 453 to the coil holding portion 561A, the cooling gas is circulated along the surface of the extension 56A1 of the coil holding portion 561A in the opposite direction to the Z direction to cool the coil holding portion 561A.

Advantages of Second Embodiment

The projector 1A according to the above-described embodiment has the following advantages in addition to the same advantages as those of the projector 1.

A distance from the sending port 433 to the coil holding portion 57 is greater than a distance from the sending port 453 to the coil holding portion 56. There is a possibility that a part of the cooling gas of which the temperature increases due to cooling of the coil holding portion 57 is circulated in the coil holding portions 56. Accordingly, cooling efficiency of the coil holding portions 56 is assumed to be lower than cooling efficiency of the coil holding portions 57.

Here, since the coil holding portion 561A includes the extension 56A1, the heat radiation area of the coil holding portion 561A including the extension 56A1 is greater than the heat radiation area of the coil holding portion 561 not including the extension 56A1. Thus, since the cooling gas is supplied to the coil holding portion 561A (the extension 56A1), it is possible to cool the coil holding portion 561A more reliably. Accordingly, it is possible to reliably cool the air-core coil CL held in the coil holding portion 561A and prevent the temperature of the air-core coil CL from being increased.

Third Embodiment

Next, a third embodiment of the invention will be described.

A projector 1B according to the embodiment has the same configuration as the projector 1, but is different from the projector 1 in that the shape of a shift element included in an electric optical device is different. In the following description, the same reference numerals are given to the same portions as the above-described portions or substantially the same portions and the description thereof will be omitted.

FIG. 14 is a perspective view illustrating a shift element 5B of the projector 1B according to the embodiment.

The shift element 5B corresponds to a light path changing element according to the invention and has a function of changing a light path of incident light. The shift element 5B includes an optical member 51, a rim 52, permanent magnets (not illustrated), a first frame 54, a second frame 55, one pair of coil holding portions 56B, and one pair of coil holding portions 57B, as illustrated in FIG. 14. In the embodiment, only the configurations of the coil holding portions 56B and 57B are different. Therefore, only the coil holding portions 56B and 57B will be described below in detail.

One pair of coil holding portions 56B and one pair of coil holding portions 57B include air-core coils CL therein and are formed of aluminum having heat conductivity, as in the coil holding portions 56. Each of the coil holding portions 561B and 562B includes a plurality of rectangular plate-shaped fins 56B1 corresponding to a heat radiation portion according to the invention. On the other hand, each of the coil holding portions 571B and 572B also include a plurality of rectangular plate-shaped fins 57B1. In this configuration, a heat radiation area of the coil holding portion 56B and 57B is greater than heat radiation area of one pair of coil holding portions 56 and 57 according to the first embodiment.

When a cooling gas is sent from the sending ports 433 and 453 to the pairs of coil holding portions 56B and 57B, the cooling gas is circulated between the plurality of fins 56B1 and 57B1 of the one pair of coil holding portions 56B and 57B to cool the pairs of coil holding portion 56B and 57B.

Advantages of Third Embodiment

The projector 1B according to the above-described embodiment has the following advantages in addition to the same advantages as those of the projector 1.

Since one pair of coil holding portions 56B and one pair of coil holding portions 57B include the fins 56B1 and 57B1 as the heat radiation portions, a heat radiation amount of the one pair of coil holding portions 56B and the one pair of coil holding portions 57B is greater than a heat radiation amount of the coil holding portions 56 and 57 not including the fins 56B1 and 57B1. Thus, since the cooling gas is supplied to the fins 56B1 and 57B1 of one pair of coil holding portions 56B and one pair of coil holding portions 57B, it is possible to cool one pair of coil holding portions 56B and one pair of coil holding portions 57B more reliably. Accordingly, it is possible to reliably cool the air-core coils CL held in one pair of coil holding portions 56B and one pair of coil holding portions 57B and prevent the temperature of the air-core coils CL from being increased.

Modifications of Embodiments

The invention is not limited to the foregoing embodiments, and modifications, improvements, and the like are included in the invention within the scope of the invention.

In the foregoing embodiments, the cooling device 4 is assumed to include the cooling fans 41R, 41G, and 41B respectively connected to the first to third duct portions 43 to 45. However, the invention is not limited thereto. For example, the number of cooling fans 41 may be one or two. In this case, the first to third duct portions 43 to 45 may have any shape as long as the cooling gas can be supplied to the first to third duct portions 43 to 45.

In the foregoing embodiments, the shift element 5 is assumed to include the optical member 51, the rim 52, the permanent magnet 53, the first frame 54, the second frame 55, one pair of coil holding portions 56, and one pair of coil holding portions 57. However, the invention is not limited thereto. For example, the first frame 54 and the second frame 55 may be integrated. One pair of coil holding portions 56 and one pair of coil holding portions 57 are included, but one of the pairs of coil holing portions may be included.

That is, any configuration can be used as long as power can be supplied to the air-core coils CL held by the coil holding portions 56 and 57, the shift element 5 can be fluctuated, and the light path of the light incident on the optical member 51 can be changed.

In the foregoing embodiments, the air-core coil CL is held by each of the coil holding portions 56 and 57. However, the invention is not limited thereto. For example, the air-core coils CL may be fixed directly to the first frame 54 and the second frame 55.

In the embodiments, the color combination device 345 is assumed to be configured by a cross dichroic prism. However, the invention is not limited thereto. For example, the color combination device 345 may have any shape as long as the light incident from the liquid crystal panels 341 can be combined.

In the foregoing embodiments, one pair of coil holding portions 56 are disposed near the corner CR3 in the first frame 54, that is, at the positions in the Y direction in the opposite direction to the X direction when the shift element 5 is viewed in the opposite direction to the Z direction. One pair of coil holding portions 57 are disposed near the corner CR2 in the first frame 54, that is, at the positions in the opposite direction to the Y direction in the X direction. However, the invention is not limited thereto. For example, the positions of one pair of coil holding portions 56 may be reverse to the positions of one pair of coil holding portions 57. Even in this case, it is possible to obtain the same advantages as those of the shift elements 5, 5A, and 5B according to the foregoing embodiments.

In the foregoing embodiments, the branch portions 431 and 451 are installed only in the first duct portion 43 and the third duct portion 45. However, the invention is not limited thereto. For example, a branch portion may be installed in the second duct portion 44 to supply from the branch portion a cooling gas to the shift element 5. In this case, the prism base 347L to which the color combination device 345 is fixed may not be provided, but a sending port may be configured instead of the connection portion 46. Thus, since the cooling gas branched from the cooling gas circulated in the first to third duct portions 43 to 45 is supplied to the substantially entire region of the shift element 5, it is possible to cool the shift element 5 more reliably.

In the foregoing embodiments, the pairs of coil holding portions 56, 57, 56A, 56B, and 57B hold the air-core coils CL. However, the invention is not limited thereto. For example, the pairs of coil holding portions 56, 57, 56A, 56B, and 57B may hold iron-core coils. That is, any shape and kind of coils may be used as long as a magnetic force can be generated by supplying power.

In the foregoing embodiments, the rim 52, the first frame 54, the second frame 55, the pairs of coil holding portions 56, 57, 56A, 56B, and 57B are formed of aluminum. However, the invention is not limited thereto. For example, the invention is not limited to aluminum, but the rim 52, the first frame 54, the second frame 55, the pairs of coil holding portions 56, 57, 56A, 56B, and 57B may be formed of any material having only to have heat conductivity.

In the foregoing embodiments, the rectification portions 436, 446, and 456 are installed at the ends of the protrusions 435, 445, and 455 in the opposite direction to the Y direction. However, the invention is not limited thereto. For example, the rectification portions 436, 446, and 456 may be internal surface of the exterior casing 2. In this case, the duct member 42 is mounted on the internal surface so that each duct portion can be formed.

In the second embodiment, the coil holding portion 561A includes the extension 56A1. However, the invention is not limited thereto. For example, the coil holding portion 562 may include an extension as in the coil holding portion 561A. Further, the coil holding portions 571 and 572 may similarly include extensions. Additionally, the fins 56B1 and 57B1 according to the third embodiment may further be included in the coil holding portions 561A and 562, 571, and 572 including the extensions.

In the third embodiment, the pairs of coil holding portions 56B and 57B all have heat sink shapes including the fins 56B1 and 57B1. However, the invention is not limited thereto. For example, the fins 56B1 and 57B1 may be installed only in the coil holding portions 561B and 571B mounted on the first frame 54 or the fins 56B1 and 57B1 may be installed only in the coil holding portions 562B and 572B mounted on the second frame 55. That is, the fins 56B1 and 57B1 may be installed in one of the coil holding portions 561B, 562B, 571B, and 572B.

The shapes of the fins 56B1 and 57B1 are not limited to the rectangular plate shape, but may have any shape. Alternatively, fins having different shapes may be installed for the respective coil holding portions 561B, 562B, 571B, and 572B. In short, the heat radiation area of the coil holding portions 561B, 562B, 571B, and 572B may be enlarged.

In the foregoing embodiments, the transmission type liquid crystal panels 341 (341R, 341G, and 341B) are used as the light modulation devices. However, the invention is not limited thereto. For example, reflection type liquid crystal panels may be used instead of the transmission type liquid crystal panels 341 (341R, 341G, and 341B). In this case, color separation and color combination may be performed by the color combination device 345 without installing the color separation device 33.

In the foregoing embodiments, the projector 1 includes the three liquid crystal panels 341 (341R, 341G, and 341B), but the invention is not limited thereto. That is, the invention can be applied to a projector that uses two or less or four or more liquid crystal panels.

Instead of the liquid crystal panels, digital micromirror devices (DMDs) or the like may be used.

In the foregoing embodiments, the projector 1 includes one pair of light source devices 31A and 31B. However, the invention is not limited thereto. For example, number of light source devices may be one or four.

In the foregoing embodiments, the image forming device 3 is disposed as in FIG. 2. However, the invention is not limited thereto. For example, the image forming device may be disposed in a substantial L shape or a substantial U shape.

Hereinafter, a fourth embodiment of the invention will be described with reference to the drawings.

Exterior Configuration of Projector

Figure 15:
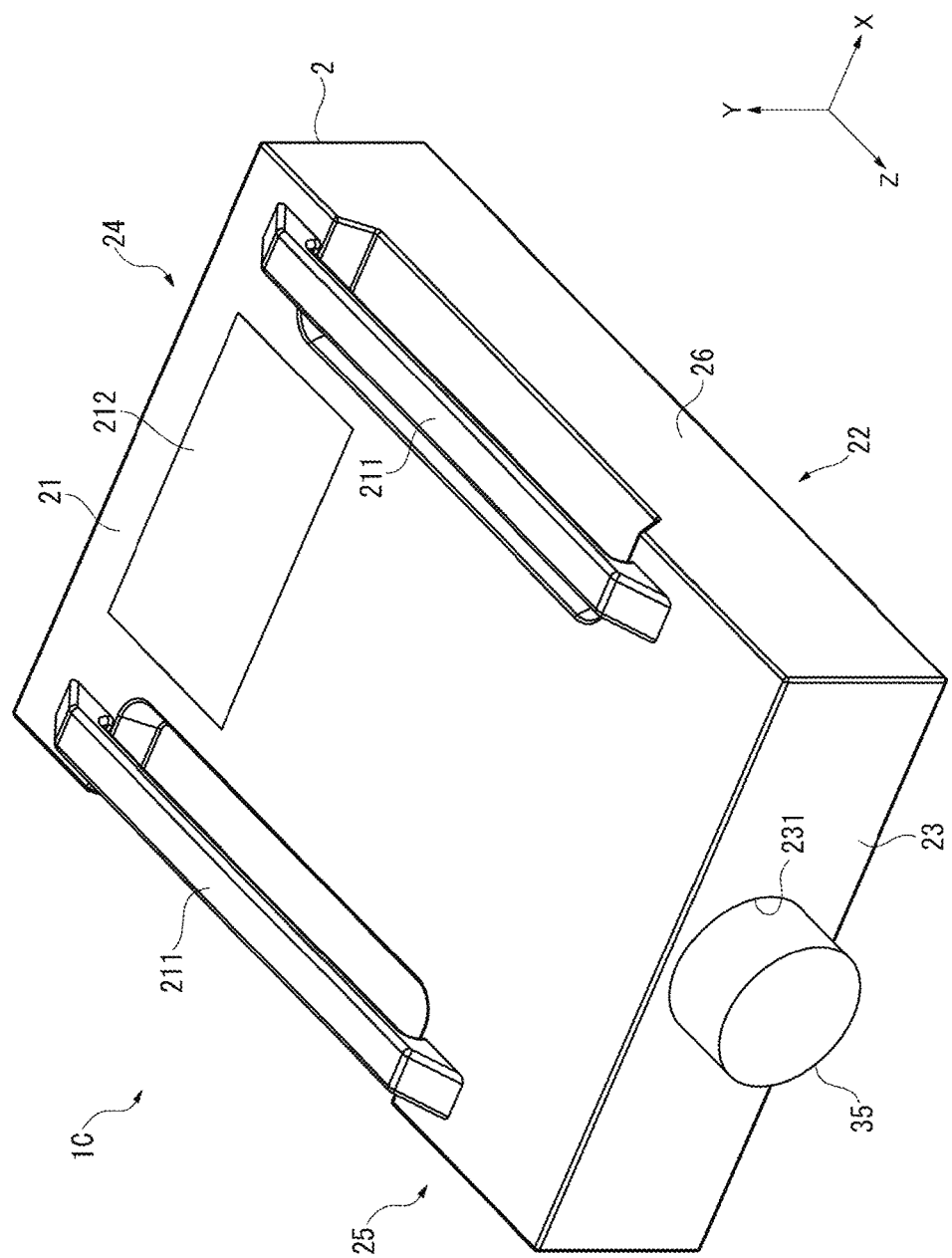
FIG. 15 is a schematic perspective view illustrating the exterior of a projector according to a fourth embodiment of the invention.

FIG. 15 is a schematic perspective view illustrating a projector 1C according to an embodiment of the invention.

The projector 1C according to the embodiment is a projection type display apparatus that modulates light emitted from an illumination device 31 to be described below to form an image according to image information and expands and projects the image to a projection surface such as a screen.

The projector 1C includes a shift element that changes a light path of incident light, as will be described below in detail. A circulation cooling device has a function of circulating and cooling the shift element in addition to a light modulation device to be described below.

As illustrated in FIG. 15, the projector 1C includes an exterior casing 2 that forms the exterior appearance.

The exterior casing 2 has a substantially rectangular parallelepiped shape that has a top surface 21, a bottom surface 22, a front surface 23, a rear surface 24, and a left side surface 25, and a right side surface 26.

In the top surface 21, an opening (not illustrated) is formed to detachably mount light source devices 31A and 31B to be described below on the inside of the exterior casing 2. The opening is covered with a cover member 212.

Although not illustrated, leg portions coming into contact with an installation surface of an installation stand when placed on the installation surface of the installation stand are installed on the bottom surface 22.

An opening 231 in which a part of the optical projection device 35 included in an image forming device 3 to be described below is exposed is formed in the front surface 23.

Although the others are not illustrated, an inlet port introducing an air outside the exterior casing 2 into the inside is formed on the right side surface 26, and an outlet port discharging the air inside the exterior casing 2 to the outside is formed on the left side surface 25.

Internal Configuration of Projector

Figure 16:
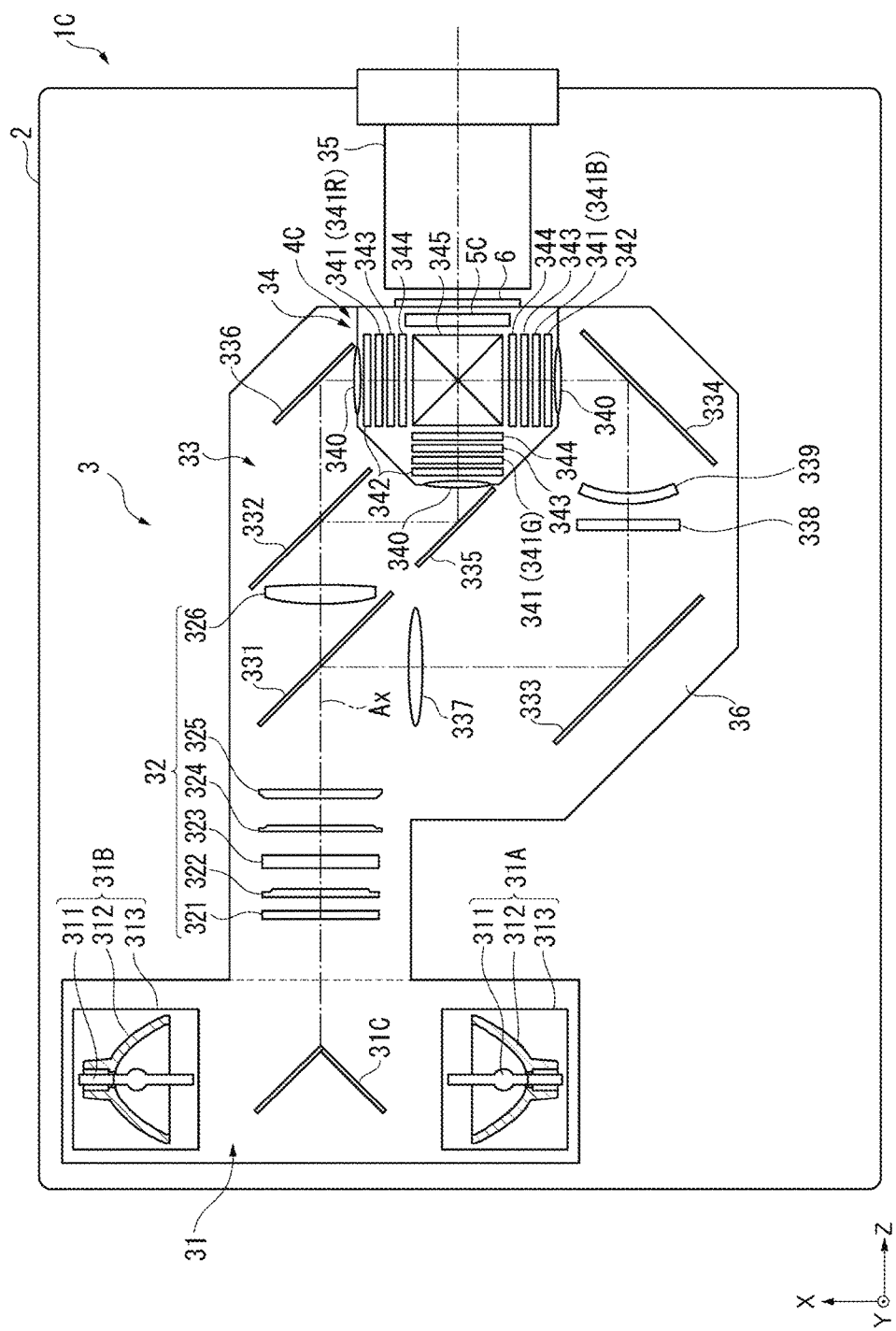
FIG. 16 is a schematic diagram illustrating an overall configuration of the projector according to the embodiment.

FIG. 16 is a schematic diagram illustrating an internal configuration of the projector 1C.

The projector 1C includes not only the exterior casing 2 but also an image forming device 3 and a circulation cooling device 4C disposed in the exterior casing 2, as illustrated in FIG. 16. Additionally, although not illustrated, the projector 1C includes a control device that controls the projector 1C and a power device that supplies power to electronic components included in the projector 1C.

Configuration of Image Forming Device

The image forming device 3 forms and projects an image according to image information input from the control device. The image forming device 3 includes an illumination device 31, a uniformalization device 32, a color separation device 33, an electric optical device 34, an optical projection device 35, and an optical component casing 36.

Of the devices, the optical component casing 36 is a box-like casing in which an illumination light axis Ax is set. The illumination device 31, the uniformalization device 32, and the color separation device 33 are disposed at positions on the illumination light axis Ax inside the optical component casing 36. The electric optical device 34 and the optical projection device 35 are located outside the optical component casing 36 and are disposed according to the illumination light axis Ax.

The illumination device 31 includes a pair of light source devices 31A and 31B which are disposed to face each other and a reflection mirror 31C disposed between the pair of light source devices 31A and 31B.

The pair of light source devices 31A and 31B each include a light source lamp 311, a reflector 312, and a housing body 313 that houses the light source lamp 311 and the reflector 312. The light source devices 31A and 31B emit light toward the reflection mirror 31C.

The reflection mirror 31C reflects the light incident from the light source devices 31A and 31B in the same direction so that the light is accordingly incident on the uniformalization device 32.

The uniformalization device 32 uniformalizes illuminance in an orthogonal plane to a central axis of a light flux emitted from the illumination device 31. The uniformalization device 32 includes a cinema filter 321, a first lens array 322, a UV filter 323, a second lens array 324, a polarization conversion element 325, and a superimposition lens 326.

Of the elements, the polarization conversion element 325 arranges polarization directions of the incident light in one kind of direction.

The color separation device 33 separates the light flux incident from the uniformalization device 32 into three pieces of color light of red (R), green (G), and blue (B). The color separation device 33 includes dichroic mirrors 331 and 332, reflection mirrors 333 to 336, and relay lenses 337 to 339.

The electric optical device 34 modulates the pieces of separated color light according to image information, and then combines the pieces of modulated color light. The electric optical device 34 includes field lends 340, liquid crystal panels 341 (red, green, and blue liquid crystal panels are referred to as liquid crystal panels 341R, 341G, and 341B, respectively) serving as light modulation devices installed for the respective pieces of color light, incidence-side polarization plates 342, exit-side polarization plates 343, optical compensation plates 344, and one color combination device 345. Of the elements, the color combination device 345 corresponds to a light combination device according to the invention. The light emitted from the color combination device 345 is incident on the shift element 5C to be described below.

The circulation cooling device 4C has a function of cooling the electric optical device 34 and the shift element 5C.

The shift element 5C increases the resolution of a projection image by periodically shifting a light path of light emitted by the color combination device 345.

A crystal diffusion plate 6 diffuses and exits the light exited from the shift element 5C and incident on the crystal diffusion plate 6 to the optical projection device 35.

The configurations of the circulation cooling device 4C and the shift element 5C will be described below in detail.

The optical projection device 35 is a projection lens that expands the light flux (which is a light flux forming an image) combined by the color combination device 345 and projects the light flux to the projection surface. An assembled lens in which a plurality of lenses are disposed in a barrel can be adopted as the optical projection device 35.

Configuration of Shift Element

Figure 17:
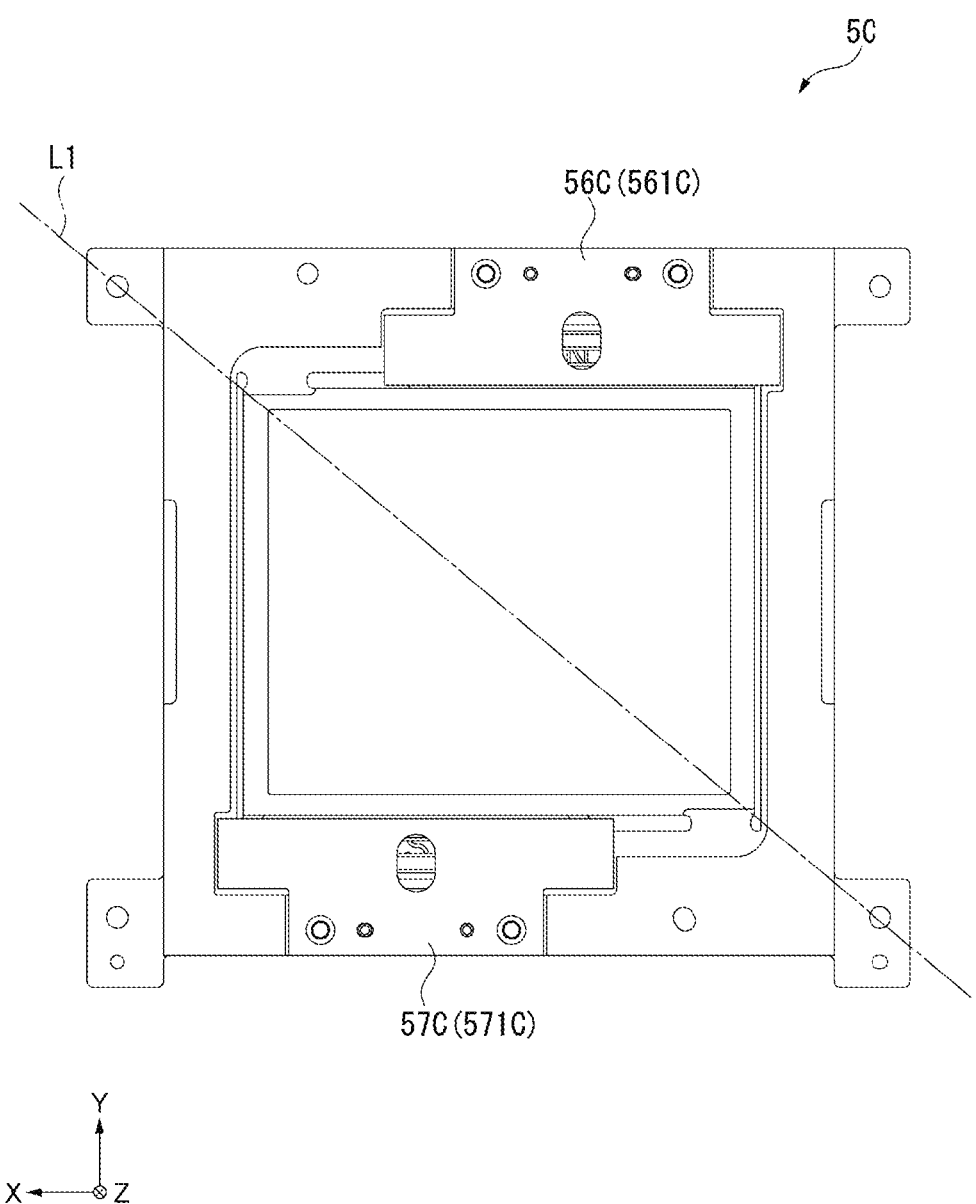
FIG. 17 is a plan view illustrating a shift element of the projector when viewed from a light incidence side according to the embodiment.
Figure 18:
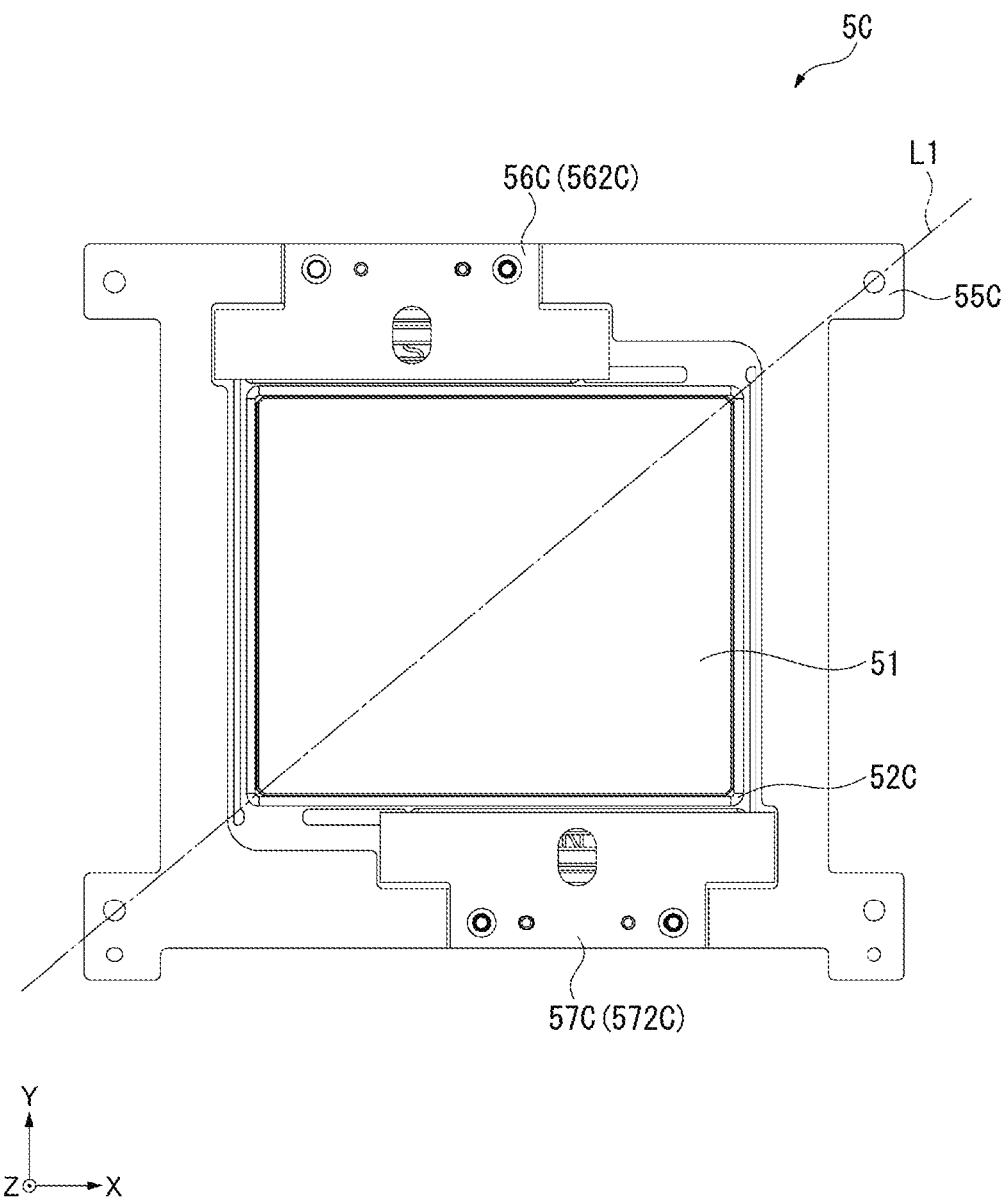
FIG. 18 is a plan view illustrating the shift element when viewed from a light exit side according to the embodiment.
Figure 19:
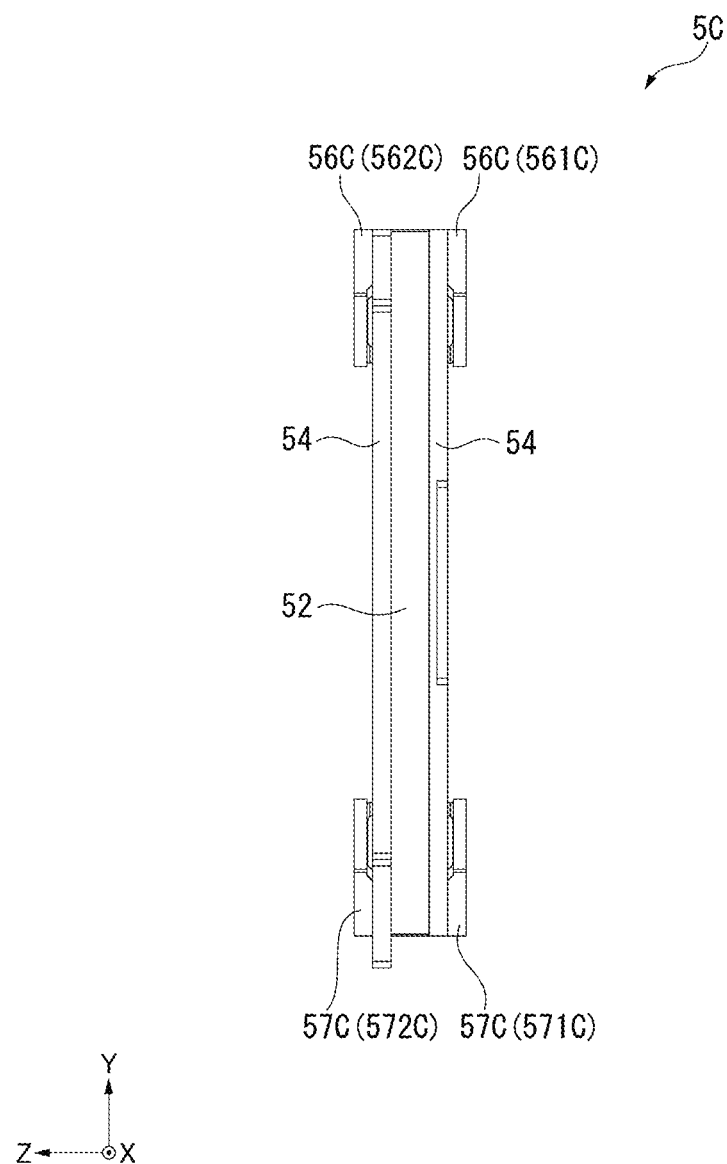
FIG. 19 is a side view illustrating the shift element according to the embodiment.
Figure 20:
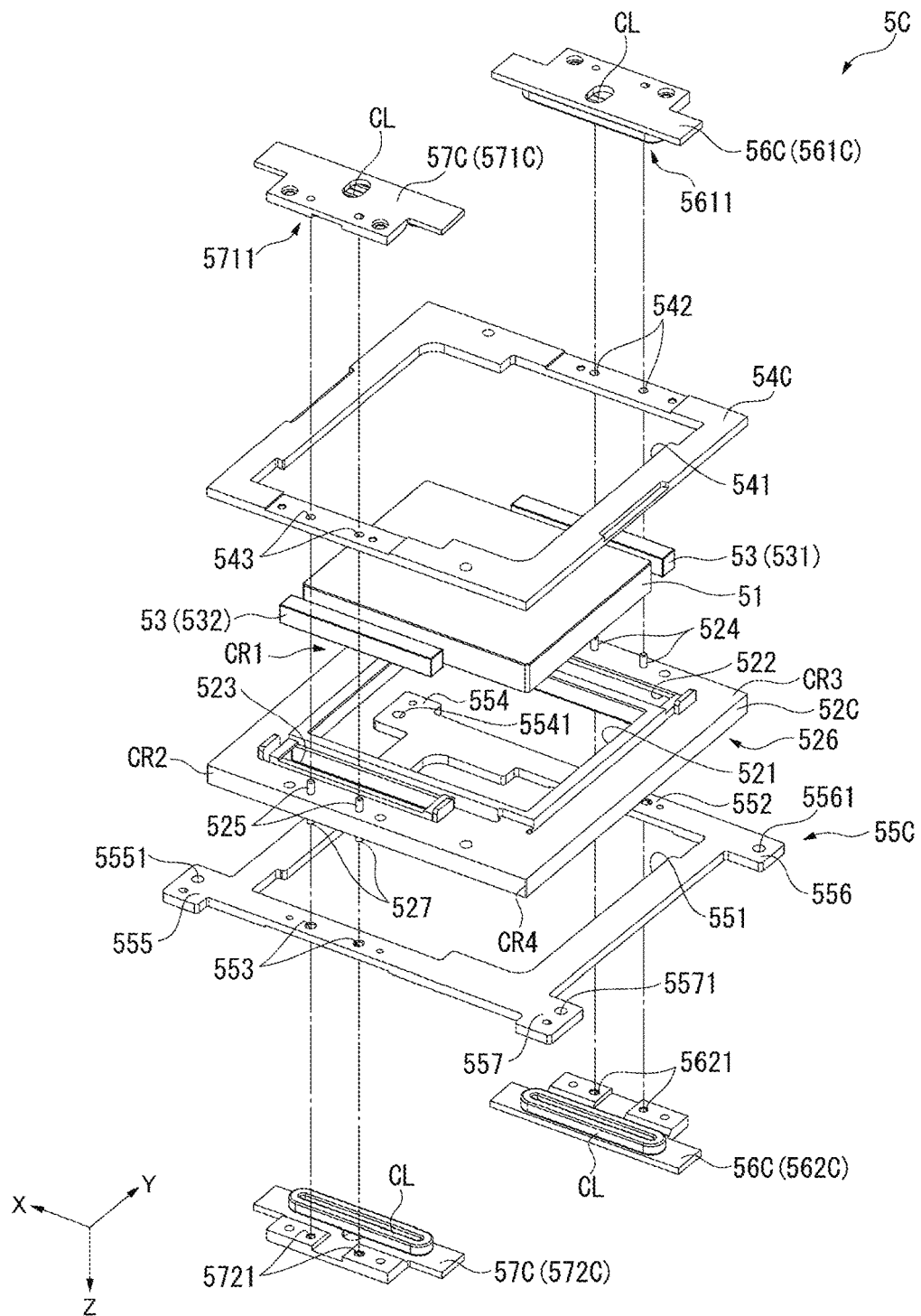
FIG. 20 is an exploded perspective view illustrating the shift element according to the embodiment.

FIG. 17 is a plan view illustrating the shift element 5C when the shift element 5C is viewed from the light incidence side. FIG. 18 is a plan view illustrating the shift element 5C when viewed from the light exit side. FIG. 19 is a side view illustrating the shift element 5C. FIG. 20 is an exploded perspective view illustrating the shift element 5C.

The shift element 5C corresponds to a light path changing element according to the invention and has a function of changing (shifting) a light path of the light incident on the shift element 5C and exited from the shift element 5C. As illustrated in FIGS. 17 to 20, the shift element 5C includes an optical member 51, a rim 52C, permanent magnets 53, a first frame 54C, a second frame 55C, and pairs of coil holding portions 56C and 57C.

Of the elements, the optical member 51 is configured as a transparent member that has transmittance and is configured of a rectangular plate glass in the embodiment.

In the following drawings and description, a travelling direction (projection direction) of the light exited from the color combination device 345 and incident on the shift element 5C is set to a Z direction, and directions orthogonal to the Z direction and orthogonal to each other are X and Y directions. In the embodiment, an upward side which is an opposite direction to the vertical direction (that is, a direction oriented from the bottom surface 22 to the top surface 21 of the exterior casing 2) is set to the Y direction in a case in which the projector 1C is disposed so that the Z direction is oriented in the horizontal direction in a plan view. A direction oriented from the left to the right when viewed in the Z direction (light traveling direction) (that is, a direction oriented from the left side surface 25 to the right side surface 26 of the exterior casing 2) is set to the X direction.

Configuration of Rim

The rim 52C has a function of holding the optical member 51 and the permanent magnets 53. As illustrated in FIG. 20, the rim 52C is configured in a rectangular plate shape that has four corners CR1 to CR4. An opening 521 in which the optical member 51 is inserted is formed in the substantially middle portion of the rim 52C. Fitting grooves 522 and 523 in which the permanent magnets 53 are inserted are formed at a position in the Y direction of the opening 521 of the rim 52C and a position in the opposite direction to the Y direction. Of the fitting grooves 522 and 523, the fitting groove 522 is formed in the opposite direction to the X direction relative to the fitting groove 523.

Positioning protrusions 524 protruding in the opposite direction to the Z direction are formed at end edges in the Y direction of the fitting groove 522 of the rim 52C and in the opposite direction to the X direction. Positioning protrusions 525 protruding in the opposite direction to the Z direction are formed at end edges in the opposite direction to the Y direction of the fitting groove 523 of the rim 52C and in the X direction. Further, positioning protrusions 526 and 527 protruding in the Z direction are formed at position corresponding to the positioning protrusions 524 and 525 on the surface of the rim 52C in the Z direction.

In other words, the positioning protrusions 524 and 526 in the Y direction are formed near the corner CR3 among the four corners CR1 to CR4 of the rim 52C. The positioning protrusions 525 and 527 in the opposite direction to the Y direction are formed near the corner CR2 which is a diagonal corner of the corner CR3.

As illustrated in FIG. 20, the permanent magnets 53 are formed in a rectangular column shape. The permanent magnet 53 (permanent magnet 531) is fitted in the fitting groove 522 and the permanent magnet 53 (permanent magnet 532) is fitted in the fitting groove 523. In this way, the permanent magnets 531 and 532 are fixed to the rim 52C.

Configuration of First Frame

The first frame 54C is disposed in the opposite direction to the Z direction of the rim 52C and has a function of interposing the rim 52C along with the second frame 55C. The first frame 54C is formed in a rectangular plate shape and an opening 541 is formed in the substantially middle of the first frame 54C. The opening 541 is formed in substantially the same shape as the optical member 51. Accordingly, light incident from the opening 541 is incident on the optical member 51.

Through holes 542 are formed at end edges in the Y direction of the first frame 54C and in the opposite direction to the X direction, and through holes 543 are formed at end edges in the opposite direction to the Y direction of the first frame 54C and in the X direction. The positioning protrusions 524 of the rim 52C are inserted into the through holes 542 and the positioning protrusions 525 are inserted into the through holes 543.

Configuration of Second Frame

The second frame 55C is disposed in the Z direction of the rim 52C and has a function of interposing the rim 52C along with the first frame 54C. The second frame 55C is formed in a rectangular plate shape and an opening 551 is formed in the substantially middle of the second frame 55C. The opening 551 is formed in substantially the same shape as the optical member 51.

Through holes 552 are formed at end edges in the Y direction of the second frame 55C and in the opposite direction to the X direction, and through holes 553 are formed at end edges in the opposite direction to the Y direction of the second frame 55C and in the X direction. The positioning protrusions 526 of the rim 52C are inserted into the through holes 552 and the positioning protrusions 527 are inserted into the through holes 553.

In this configuration, the first frame 54C and the second frame 55C interpose the rim 52C. The rim 52C, the first frame 54C, and the second frame 55C correspond to a holding portion according to the invention.

Configuration of Coil Holding Portion

One pair of coil holding portions 56C and one pair of coil holding portions 57C each include an air-core coil CL corresponding to a coil according to the invention therein. When power is supplied to the air-core coil CL, the air-core coil CL displaces the permanent magnet 53 and further generates a magnetic force that displaces the shift element 5C. Of the portions, one pair of coil holding portions 56C includes a coil holding portion 561C fixed to the first frame 54C and a coil holding portion 562C fixed to the second frame 55C.

Holes 5611 and 5621 are formed in the coil holding portions 561C and 562C, respectively. The positioning protrusions 524 of the rim 52C are fitted into the holes 5611 through the through holes 542 of the first frame 54C. On the other hand, the positioning protrusions 526 of the rim 52C are fitted into the holes 5621 through the through holes 552 of the second frame 55C. Accordingly, the coil holding portion 561C is fixed to the first frame 54C and the coil holding portion 562C is fixed to the second frame 55C.

One pair of coil holding portions 57C includes a coil holding portion 571C fixed to the first frame 54C and a coil holding portion 572C fixed to the second frame 55C. Holes 5711 and 5721 are formed in the coil holding portions 571C and 572C, respectively. The positioning protrusions 525 of the rim 52C are fitted into the holes 5711 through the through holes 543 of the first frame 54C. On the other hand, the positioning protrusions 527 of the rim 52C are fitted into the holes 5721 through the through holes 553 of the second frame 55C. Accordingly, the coil holding portion 571C is fixed to the first frame 54C and the coil holding portion 572C is fixed to the second frame 55C.

In this way, the coil holding portions 561C and 562C of one pair of coil holding portions 56C are disposed near the corner CR3 in the Y direction in the opposite direction to the X direction and at superimposing positions and orientation. On the other hand, the coil holding portions 571C and 572C of one pair of coil holding portions 57C are disposed near the corner CR2 in the X direction and the opposite direction to the Y direction and at superimposing positions and orientation in a case in which the shift element 5C is viewed in the Z direction. In other words, when the shift element 5C is viewed in the opposite direction to the Z direction, one pair of coil holding portions 56C are disposed on the side of the liquid crystal panel 341B and one pair of coil holding portions 57C are disposed on the side of the liquid crystal panel 341R.

The rim 52C, the first frame 54C, and the second frame 55C, one pair of coil holding portions 56C, and one pair of coil holding portions 57C are formed of metal having heat conductivity and are formed of aluminum in the embodiment. Accordingly, in a case in which the temperature of the air-core coil CL increases, heat of the rim 52C, the first frame 54C, the second frame 55C, and the air-core coils CL of one pair of coil holding portions 56C and one pair of coil holding portions 57C is transmitted.

Power supply portions (not illustrated) are connected to the coil holding portions 561C, 562C, 571C, and 572C. The power supply portions supply power to the air-core coils CL via the coil holding portions 561C, 562C, 571C, and 572C to displace the permanent magnets 531 and 532 and further generate a magnetic force to displace the shift element 5C.

Specifically, when the permanent magnets 531 and 532 mounted on the rim 52C are displaced, the shift element 5C is moved in approaching and separating directions at a rotational angle L1 illustrated in FIGS. 17 and 18, so that the angle of the optical member 51 inserted into the opening 521 of the rim 52C is changed.

In other words, by supplying power to the coil holding portions 561C, 562C, 571C, and 572C, it is possible to change the light path of the light incident on the optical member 51 and exited from the optical member 51.

Configuration of Circulation Cooling Device

FIG. 21 is a schematic diagram illustrating a schematic configuration of the circulation cooling device 4C. In FIG. 21, in order to facilitate the description, other elements are not illustrated except for a liquid crystal panel 341G, field lenses 340 corresponding to the liquid crystal panel 341G, an incidence-side polarization plate 342, an exit-side polarization plate 343, and an optical compensation plate 344 included in the electric optical device 34.

The circulation cooling device 4C includes a sealed casing 41C corresponding to an internal casing according to the invention and has a function of cooling the electric optical device 34 and the shift element 5C disposed in the sealed casing 41C. The circulation cooling device 4C includes a prism base 42C, a first fan 43C, a second fan 44C, and a heat sink 45C in addition to the sealed casing 41C.

When the shift element 5C is disposed in the sealed casing 41C, heat transmission portions TC1 to TC4 are fixed to the coil holding portions 561C, 562C, 571C, and 572C, respectively. The heat transmission portions TC1 to TC4 are formed of heat transmission sheets having heat conductivity. Therefore, when the temperature of the air-core coil CL increases, the heat of the coil holding portions 561C, 562C, 571C, and 572C is transmitted to the heat transmission portions TC1 to TC4.

Configuration of Sealed Casing

The sealed casing 41C is a box-like casing that accommodates the liquid crystal panels 341, the incidence-side polarization plate 342, exit-side polarization plate 343, the optical compensation plate 344, the color combination device 345, and a holding member 346 included in the electric optical device 34 and the shift element 5C. The sealed casing 41C is disposed in the exterior casing 2. The sealed casing 41C has a sealed structure in which a gas outside the sealed casing 41C rarely flows therein. In other words, the liquid crystal panels 341, the incidence-side polarization plate 342, the exit-side polarization plate 343, the optical compensation plate 344, the color combination device 345, a holding member 346, and the shift element 5C are substantially sealed in the sealed casing 41C.

The sealed casing 41C includes a top surface 41a, a bottom surface 41b, a first side surface 41c, a second side surface 41d, and third and fourth side surfaces (not illustrated) in the X direction and the opposite direction to the X direction. The sealed casing 41C includes a casing portion 411 formed by the top surface 41a, the bottom surface 41b, the first side surface 41c, and the third and fourth side surfaces and includes a plate-shaped portion 412 and a crystal diffusion plate 6 formed by the second side surface 41d.

Of the elements, the casing portion 411 is formed of resin or the like. An opening 4111 is formed in a substantially middle of the first side surface 41c forming the casing portion 411. The field lens 340 corresponding to the liquid crystal panel 341G is inserted into the opening 4111. Openings are also formed in the substantially middle of the third side surface and in the substantially middle of the fourth side surface. The field lenses 340 corresponding to the liquid crystal panels 341R and 341B are inserted into the openings. Thus, the pieces of color light separated by the color separation device 33 are incident on the liquid crystal panels 341 through the field lenses 340.

The plate-shaped portion 412 forms a part of the second side surface 41d of the sealed casing 41C and an opening 4121 is formed in a substantial middle of the plate-shaped portion 412. The crystal diffusion plate 6 is inserted into the opening 4121. The plate-shaped portion 412 is formed of a metal having heat conductivity and is formed of aluminum in the embodiment.

The heat transmission portion TC1 comes into contact with a first spot 4122 of the plate-shaped portion 412 located in the Y direction so that heat is transmittable. The heat transmission portion TC2 comes into contact with a second spot 4123 of the plate-shaped portion 412 located in the opposite direction to the Y direction so that heat is transmittable. The prism base 42U is fixed to the first spot 4122 and the prism base 42L is fixed to the second spot 4123. Therefore, when the temperature of the air-core coil CL increases, the heat of the coil holding portions 562C and 572C is transmitted to the heat transmission portions TC1 and TC2, and the heat of the heat transmission portions TC1 and TC2 is transmitted to the plate-shaped portion 412.

The first spot 4122 and the second spot 4123 correspond to a heat transmission spot according to the invention.

Configuration of Prism Base

Here, of the constituent elements of the electric optical device 34, the liquid crystal panels 341 (341R, 341G, and 341B), the exit-side polarization plate 343, and the optical compensation plate 344 are mounted on the color combination device 345 by the holding member 346 to form an integrated prism unit. The color combination device 345 forming the prism unit is configured by a substantially quadrangular cross dichroic prism. The color combination device 345 includes three incidence surfaces on which pieces of light exited from the liquid crystal panels 341 are separately incident, one exit surface from which the light incident from the incidence surfaces and combined is exited, and a first support surface 3451C and a second support surface 3452C which intersect the plurality of incidence surfaces and the exit surface and are located to be opposite to each other and are connected to the prism base 42C.

The prism base 42C corresponds to a support member according to the invention and has a function of fixing the prism unit to the inside of the sealed casing 41C by supporting the color combination device 345. The prism base 42C is formed of metal having heat conductivity and is formed of aluminum in the embodiment. The prism base 42C includes a prism base 42U corresponding to a first support portion according to the invention and a prism base 42L corresponding to a second support portion according to the invention.

The prism bases 42U and 42L include support portions 421U and 421L with a substantial L shape and extensions 422U and 422L extending from ends of the support portions 421U and 421L in the Z direction, as illustrated in FIG. 21.

The first support surface 3451C which is a surface of the color combination device 345 in the Y direction comes into contact with the surface of the support portion 421U of the prism base 42U in the opposite direction to the Y direction, and the heat transmission portion TC3 comes into contact with the surface of the support portion 421U in the Z direction so that heat is transmittable. The end of the extension 422U in the Z direction is fixed to the surface of the plate-shaped portion 412 in the opposite direction to the Z direction.

On the other hand, the second support surface 3452C which is a surface of the color combination device 345 in the opposite direction to the Y direction comes into contact with the surface of the support portion 421L of the prism base 42L in the Y direction, and the heat transmission portion TC4 comes into contact with the surface of the support portion 421L in the Z direction so that heat is transmittable. The end of the extension 422L in the Z direction is fixed to the surface of the plate-shaped portion 412 in the opposite direction to the Z direction.

In this configuration, the prism unit (the color combination device 345) is fixed to the inside of the sealed casing 41C and the heat from the heat transmission portions TC3 and TC4 is transmitted to the prism bases 42U and 42L.

Heat radiation fins may be installed on the surfaces of the prism bases 42U and 42L. By installing the heat radiation fins, it is possible to expand a contact area with the cooling gas discharged from the first fan 43C to be described below, and thus it is possible to efficiently cool the heat transmitted from the heat transmission portions TC3 and TC4.

Configuration of Cooling Fan

The first fan 43C corresponds to apart of the cooling device according to the invention and is formed by a sirocco fan. As illustrated in FIG. 21, the first fan 43C is disposed on the side of the first side surface 41c on the bottom surface 41b. The first fan 43C is disposed so that a suction surface 431C is oriented in the Y direction. An exhaust surface 432C is disposed to be oriented in the Z direction. Therefore, when the first fan 43C is driven, the cooling gas inside the sealed casing 41C is sucked from the suction surface 431C and the cooling gas is discharged from the exhaust surface 432C in the Z direction. A part of the cooling gas discharged from the exhaust surface 432C is branched in the Y direction by a duct (not illustrated) and the branched cooling gas cools the liquid crystal panels 341, the incidence-side polarization plate 342, the exit-side polarization plate 343, and the like.

The second fan 44C corresponds to a part of a cooling device according to the invention and is configured of an axial fan. The second fan 44C is disposed in the top surface 41a and the first side surface 41c in the sealed casing 41C. The second fan 44C is disposed so that a suction surface 441C is oriented in the Y direction. An exhaust surface 442C facing the suction surface 441C is disposed to be oriented in the opposite direction to the Y direction. That is, the suction surface 431C of the first fan 43C and the exhaust surface 442C of the second fan 44C are disposed to face each other. Therefore, when the second fan 44C is driven, the cooling gas sucked from the suction surface 441C of the second fan 44C and present inside the sealed casing 41C is discharged from the exhaust surface 442C to the first fan 43C and the cooling gas is sucked by the first fan 43C.

The first fan 43C and the second fan 44C are configured by a sirocco fan and an axial fan, respectively, but the invention is not limited thereto. Both of the first fan 43C and the second fan 44C may be configured by sirocco fans or may be configured by axial fans.

Configuration of Heat Sink

The heat sink 45C has a function of reducing temperature of a spot to which the heat sink 45C is connected. The heat sink 45C is connected to the top surface 41a of the sealed casing 41C. Thus, the cooling gas circulated in a position facing the heat sink 45C in the sealed casing 41C is cooled by the heat sink 45C.

Circulation Flow Passage of Cooling Gas

When the first fan 43C is driven in the circulation cooling device 4C having such a configuration, the cooling gas sucked from the suction surface 431C is discharged from the exhaust surface 432C and is circulated along the bottom surface 41b. The cooling gas circulated along the bottom surface 41b collides against the second side surface 41d and is circulated in the Y direction, that is, toward the top surface 41a. During the circulation of the cooling gas from the bottom surface 41b to the top surface 41a, the shift element 5C, the prism bases 42U and 42L, the prism unit, and the plate-shaped portion 412 are cooled by the cooling gas. Then, the cooling gas cooling the shift element 5C, the prism bases 42U and 42L, the prism unit, and the plate-shaped portion 412 is circulated along the top surface 41a by suction from the suction surface 441C of the second fan 44C. During this circulation, the cooling gas is cooled by the heat sink 45C and is sucked to the second fan 44C. Then, the cooling gas is discharged from the exhaust surface 442C of the second fan 44C to the first fan 43C and is sucked from the suction surface 431C of the first fan 43C.

As described above, the cooling gas inside the sealed casing 41C is circulated clockwise by driving the first fan 43C and the second fan 44C. In this way, the plate-shaped portion 412 to which the heat from the coil holding portions 562C and 572C and the heat transmission portions TC1 and TC2 is transmitted is cooled. Further, the prism bases 42U and 42L to which the heat from the coil holding portions 561C and 571C and the heat transmission portions TC3 and TC4 is transmitted are cooled. Thus, the heat transmitted from the air-core coil CL is radiated and the air-core coil CL is thus cooled.

The projector 1C according to the above-described embodiment has the following advantages.

Since the plurality of liquid crystal panels 341R, 341G, and 341B, the shift element 5C, and the color combination device 345 are disposed in the sealed casing 41C, it is possible to prevent dust from being attached to the liquid crystal panels 341, the color combination device 345, and the shift element 5C. Accordingly, it is possible to improve luminance and saturation of an image to be projected from the projector 1C.

Here, when power is supplied to one pair of air-core coils CL disposed with the permanent magnet 53 interposed therebetween, the permanent magnet 53 is displaced, and thus the magnetic force displacing the shift element 5C is generated and the temperature of the one pair of air-core coils CL is increased. When the temperature of the one pair of air-core coils CL is increased in this way, the magnetic force of the one pair of air-core coils CL generating the magnetic force is weakened in some cases.

In contrast, in the embodiment, the heat transmission portions TC1 to TC4 fixed to the coil holding portions 561C, 562C, 571C, and 572C of the shift element 5C come into contact with the prism base 42C serving as a support member. Therefore, when the heat of the air-core coils CL is increased, the heat of the air-core coils CL is transmitted to the support member via the heat transmission portions. Thus, it is possible to prevent the temperature of one pair of air-core coils CL included in the shift element 5C from being increased. Accordingly, since it is possible to prevent the magnetic force of the air-core coils CL installed in the shift element 5C from being reduced, it is possible to stabilize driving of the shift element 5C.

The support portions 421U and 421L supporting the first support surface 3451C and the second support surface 3452C of the color combination device 345 come into contact with the heat transmission portions TC3 and TC4. Therefore, when the heat of the air-core coils CL is increased, the heat of the air-core coils CL is transmitted to the prism base 42C via the heat transmission portions TC3 and TC4. Thus, it is possible to prevent the temperature of one pair of air-core coils CL included in the shift element 5C from being increased. Accordingly, since it is possible to prevent the magnetic force of the air-core coils CL installed in the shift element 5C from being reduced, it is possible to stabilize driving of the shift element 5C.

The heat transmission portions TC1 and TC2 come into contact with the sealed casing 41C, more specifically, the first spot 4122 and the second spot 4123 having heat conductivity in the sealed casing 41C so that heat is transmittable. When the heat of the air-core coils CL is increased, the heat of the air-core coils CL is transmitted to the plate-shaped portion 412 of the sealed casing 41C via the heat transmission portions TC1 and TC2. Thus, it is possible to reliably prevent the temperature of one pair of air-core coils CL included in the shift element 5C from being increased. Accordingly, since it is possible to reliably prevent the magnetic force of the air-core coils CL installed in the shift element 5C from being reduced, it is possible to reliably stabilize driving of the shift element 5C.

Since the first fan 43C is disposed as the cooling device in the sealed casing 41C, it is possible to cool the liquid crystal panels 341, the shift element 5C, and the color combination device 345 disposed in the sealed casing 41C. Since the cooling gas is circulated to the prism base 42C to which the heat of the air-core coils CL is transmitted via the heat transmission portions TC1 to TC4, it is possible to reliably cool the prism base 42C. Accordingly, it is possible to prevent the temperature of one pair of air-core coils CL included in the shift element 5C from being increased.

Modifications of Embodiment

The invention is not limited to the foregoing embodiments, but modifications, improvement, and the like are included in the invention within the scope of the invention.

In the foregoing embodiment, the shift element 5C, the color combination device 345, and the liquid crystal panels 341 are disposed in the sealed casing 41C. However, the invention is not limited thereto. For example, only the shift element 5C may be disposed in the sealed casing 41C or only the shift element 5C and the liquid crystal panels 341 may be disposed in the sealed casing 41C. In summary, the shift element 5C may be disposed in the sealed casing 41C.

In the foregoing embodiment, the sealed casing 41C is substantially sealed. However, the invention is not limited thereto. For example, the sealed casing 41C may not be sealed or may be configured to supply the cooling gas from a spot which is not sealed.

In the foregoing embodiment, the heat transmission portions TC1 to TC4 are fixed to the coil holding portions 561C, 562C, 571C, and 572C. However, the invention is not limited thereto. For example, the heat transmission portions TC1 to TC4 may not be included and the coil holding portions 561C, 562C, 571C, and 572C may be configured to come into contact with the prism base 42C and the plate-shaped portion 412 so that heat is directly transmittable. Even in this case, it is possible to obtain the same advantages as those of the forgoing embodiment.

In the foregoing embodiment, the heat transmission portions TC1 to TC4 are formed of heat transmission sheets having heat conductivity. However, the invention is not limited thereto. For example, the heat transmission portions TC1 to TC4 may be configured of grease or the like having heat conductivity without being limited to solid. That is, the heat transmission portions TC1 to TC4 may be formed of any material as long as the material has heat conductivity.

In the foregoing embodiment, the first spot 4122 and the second spot 4123 of the plate-shaped portion 412 with which the heat transmission portions TC1 and TC2 come into contact so that heat is transmittable have the heat conductivity. However, the invention is not limited thereto. For example, the plate-shaped portion 412 may be formed of resin or the like.

In the foregoing embodiment, the heat transmission portions TC1 and TC2 come into contact with the plate-shaped portion 412 so that heat is transmittable. However, the invention is not limited thereto. For example, only the heat transmission portion TC1 may come into contact with the plate-shaped portion 412 so that heat is transmittable or only the heat transmission portion TC2 may come into contact with the plate-shaped portion 412 so that heat is transmittable. In this case, in the heat transmission portions TC1 and TC2, a spot which does not come into contact with the plate-shaped portion 412 so that heat is transmittable may be formed of a material having no heat conductivity.

In the foregoing embodiment, the circulation cooling device 4C includes the first fan 43C and the second fan 44C. However, the invention is not limited thereto. For example, the circulation cooling device 4C may include one of the first fan 43C and the second fan 44C. Even in this case, it is possible to cool the liquid crystal panels 341, the color combination device 345, and the shift element 5C disposed in the sealed casing 41C. The first pan 43C and the second fan 44C may not be present in the sealed casing 41C. In this case, for example, the heat sink may come into contact with a portion other than the sealed casing 41C so that the cooling is performed by a cooling fan from the portion other than the sealed casing 41C.

In the foregoing embodiment, the heat sink 45C included in the circulation cooling device 4C is connected to the top surface 41a. However, the invention is not limited thereto. For example, the heat sink 45C may be installed on any of the bottom surface 41b, the first side surface 41c, and the second side surface 41d. Further, the number of heat sinks 45C may not be one, the heat sinks 45C may be installed on the bottom surface 41b, the first side surface 41c, and the second side surface 41d, or the heat sink 45C may not be installed.

In the foregoing embodiment, the prism bases 42U and 42L are included. However, the invention is not limited thereto. For example, only one of the prism bases 42U and 42L may be included. In particular, when only the prism base 42U is included, it is possible to further circulate the cooling gas from the bottom surface 41b to the shift element 5C.

In the foregoing embodiment, the first support surface 3451C and the second support surface 3452C supported by the prism bases 42U and 42L are the surface in the Y direction of the color combination device 345 and the surface in the opposite direction to the Y direction. However, the invention is not limited thereto. For example, the prism bases 42U and 42L may support the surface of the color combination device 345 in the X direction and the surface in the opposite direction to the X direction. In this case, the liquid crystal panels 341R and 341B serving as the light modulation device may be disposed to face the first support surface 3451C and the second support surface 3452C.

In the foregoing embodiment, the shift element 5C includes the optical member 51, the rim 52C, the permanent magnet 53, the first frame 54C, the second frame 55C, and one pair of coil holding portions 56C and 57C. However, the invention is not limited thereto. For example, the first frame 54C and the second frame 55C may be integrated. One pair of coil holding portions 56C and one pair of coil holding portions 57C are included, but only one pair of coil holding portions may be included.

That is, any configuration can be used as long as power can be supplied to the air-core coils CL held by the coil holding portions 56C and 57C, the optical member 51 can be fluctuated, and the light path of the light incident on the optical member 51 can be changed.

In the foregoing embodiment, the shift element 5C has the configuration illustrated in FIGS. 17 to 20. However, the invention is not limited thereto. For example, any configuration may be used as long as the optical member 51 can be fluctuated by a solenoid or the like and the light path of the incident light can be changed.

In the foregoing embodiment, the second side surface 41d is formed by the plate-shaped portion 412 and the crystal diffusion plate 6. However, the invention is not limited thereto. For example, the second side surface 41d may be formed by a transparent member that merely passes the light from the shift element 5C, instead of the crystal diffusion plate 6.

In the foregoing embodiment, the air-core coils CL are held by the coil holding portions 56C and 57C. However, the invention is not limited thereto. For example, the air-core coils CL may be configured to be directly fixed to the first frame 54C and the second frame 55C.

In the foregoing embodiment, the color combination device 345 is configured by the cross dichroic prism. However, the invention is not limited thereto. For example, the color combination device 345 may have any shape as long as the light incident from the liquid crystal panels 341 can be combined.

In the foregoing embodiment, one pair of coil holding portions 56C are disposed near the corner CR3 in the first frame 54C, that is, at the positions in the Y direction in the opposite direction to the X direction when the shift element 5C is viewed in the opposite direction to the Z direction. One pair of coil holding portions 57C are disposed near the corner CR2 in the first frame 54C, that is, at the positions in the opposite direction to the Y direction in the X direction. However, the invention is not limited thereto. For example, the positions of one pair of coil holding portions 56C may be reverse to the positions of one pair of coil holding portions 57C.

In the foregoing embodiment, the pairs of coil holding portions 56C and 57C hold the air-core coils CL. However, the invention is not limited thereto. For example, the pairs of coil holding portions 56C and 57C may hold iron-core coils. That is, any shape and kind of coils may be used as long as a magnetic force can be generated by supplying power.

In the foregoing embodiment, the rim 52C, the first frame 54C, the second frame 55C, the pairs of coil holding portions 56C and 57C are formed of aluminum. However, the invention is not limited thereto. For example, the invention is not limited to aluminum, but the rim 52C, the first frame 54C, the second frame 55C, the pairs of coil holding portions 56C and 57C may be formed of any material having only to have heat conductivity.

In the foregoing embodiment, the transmission type liquid crystal panels 341 (341R, 341G, and 341B) are used as the light modulation devices. However, the invention is not limited thereto. For example, reflection type liquid crystal panels may be used instead of the transmission type liquid crystal panels 341 (341R, 341G, and 341B). In this case, color separation and color combination may be performed by the color combination device 345 without installing the color separation device 33.

In the foregoing embodiment, the projector 1C includes the three liquid crystal panels 341 (341R, 341G, and 341B), but the invention is not limited thereto. That is, the invention can be applied to a projector that uses two or less or four or more liquid crystal panels.

Instead of the liquid crystal panels 341, digital micromirror devices (DMDs) or the like may be used.

In the foregoing embodiment, the projector 1C includes one pair of light source devices 31A and 31B. However, the invention is not limited thereto. For example, the number of light source devices may be one or four.

In the foregoing embodiment, the image forming device 3 is disposed as in FIG. 16. However, the invention is not limited thereto. For example, the image forming device may be disposed in a substantial L shape or a substantial U shape.

What is claimed is:
1. A projector comprising:
a light source;
a plurality of light modulation devices that modulate light emitted from the light source;
an optical projection device that projects the light modulated by the plurality of light modulation devices;
a light path changing element that is disposed between the plurality of light modulation devices and the optical projection device and changes a light path of the light modulated by the plurality of light modulation devices through fluctuation;

an exterior casing that forms an exterior;

an internal casing in which the light path changing element is disposed;

a light combination device that combines and exits pieces of light modulated by the plurality of light modulation devices; and a support member that is disposed in the internal casing and supports the light combination device, wherein the optical projection device projects the light exited from the light combination device, the light combination device is disposed in the internal casing, the light path changing element includes a permanent magnet, an optical member that changes the light path of the light fluctuated and incident by the permanent magnet, a holding portion that holds the optical member and the permanent magnet, a pair of coils that are disposed in the holding portion with the permanent magnet interposed therebetween, a coil holding portion that holds the one pair of coils, and a heat transmission portion that comes into contact with the coil holding portion, and the heat transmission portion comes into contact with the support member so that heat is transmittable to the support member.

2. The projector according to claim 1, wherein the plurality of light modulation devices are disposed in the internal casing.

3. The projector according to claim 1, wherein the internal casing is a sealed casing, wherein the light combination device includes first and second support surfaces that are located to be opposite to each other and are connected to the support member, wherein the support member includes a first support portion connected to the first support surface and a second support portion connected to the second support surface, and wherein the heat transmission portion comes into contact with at least one of the first and second support portions so that heat is transmittable.

4. The projector according to claim 1, wherein the heat transmission portion comes into contact with the internal casing so that heat is transmittable.

5. The projector according to claim 4, wherein the internal casing includes a heat transmission spot coming into contact with the heat transmission portion.

6. The projector according to claim 1, further comprising:

a cooling device that is disposed in the internal casing and circulates a cooling gas in the internal casing, wherein a part of the cooling gas is circulated in the support member.

* * * * *